United States Patent
Ohya et al.

(10) Patent No.: US 8,420,211 B2
(45) Date of Patent: Apr. 16, 2013

(54) POROUS POLYIMIDE MEMBRANE AND PROCESS FOR PRODUCTION OF SAME

(75) Inventors: Shyusei Ohya, Chiba (JP); Makoto Matsuo, Chiba (JP)

(73) Assignee: Ube Industries, Ltd., Ube-shi (JP)

( * ) Notice: Subject to any disclaimer, the term of this patent is extended or adjusted under 35 U.S.C. 154(b) by 113 days.

(21) Appl. No.: 13/121,830

(22) PCT Filed: Oct. 2, 2009

(86) PCT No.: PCT/JP2009/067266
§ 371 (c)(1),
(2), (4) Date: Jun. 10, 2011

(87) PCT Pub. No.: WO2010/038873
PCT Pub. Date: Apr. 8, 2010

(65) Prior Publication Data
US 2011/0318556 A1 Dec. 29, 2011

(30) Foreign Application Priority Data

Oct. 2, 2008 (JP) .................................. 2008-257805

(51) Int. Cl.
*B32B 3/26* (2006.01)
*B29C 71/02* (2006.01)
*C08G 69/26* (2006.01)

(52) U.S. Cl.
USPC .................. 428/316.6; 428/315.5; 428/315.7; 428/315.9; 428/310.5; 264/234; 264/46.4; 524/538

(58) Field of Classification Search ............... 428/316.6, 428/315.5, 315.7, 315.9, 310.5; 264/234, 264/46.4; 524/538
See application file for complete search history.

(56) References Cited

U.S. PATENT DOCUMENTS

| 5,972,080 A | 10/1999 | Nagata |
| 2005/0118479 A1* | 6/2005 | Yamaguchi et al. ............ 429/33 |

FOREIGN PATENT DOCUMENTS

| JP | 59209611 | 11/1984 |
| JP | 10 85571 | 4/1998 |
| JP | 11 310658 | 11/1999 |
| JP | 2003 38942 | 2/2003 |
| JP | 2003201363 | 7/2003 |

OTHER PUBLICATIONS

International Search Report issued Nov. 2, 2009 in PCT/JP09/67266 filed Oct. 2, 2009.
European Search Report issued Jan. 23, 2013 in Application No. 09817905.4-2115/2354180.

* cited by examiner

*Primary Examiner* — Hai Vo
(74) *Attorney, Agent, or Firm* — Oblon, Spivak, McClelland, Maier & Neustadt, L.L.P.

(57) ABSTRACT

Disclosed is a porous polyimide membrane of a three-layer structure having two surface layers (a) and (b) and a macrovoid layer interposed between the surface layers (a) and (b), wherein the macrovoid layer has a partition wall joined to the surface layers (a) and (b) and plural macrovoids surrounded by the partition wall and the surface layers (a) and (b), with an average void diameter in a membrane plane direction of from 10 to 500 μm; each of the partition wall of the macrovoid layer and the surface layers (a) and (b) has a thickness of from 0.1 to 50 μm and has plural pores having an average pore diameter of from 0.01 to 5 μm, the pores being communicated with each other and also communicated with the macrovoids; and the membrane has a total membrane thickness of from 5 to 500 μm and a porosity of from 70 to 95%.

20 Claims, 11 Drawing Sheets

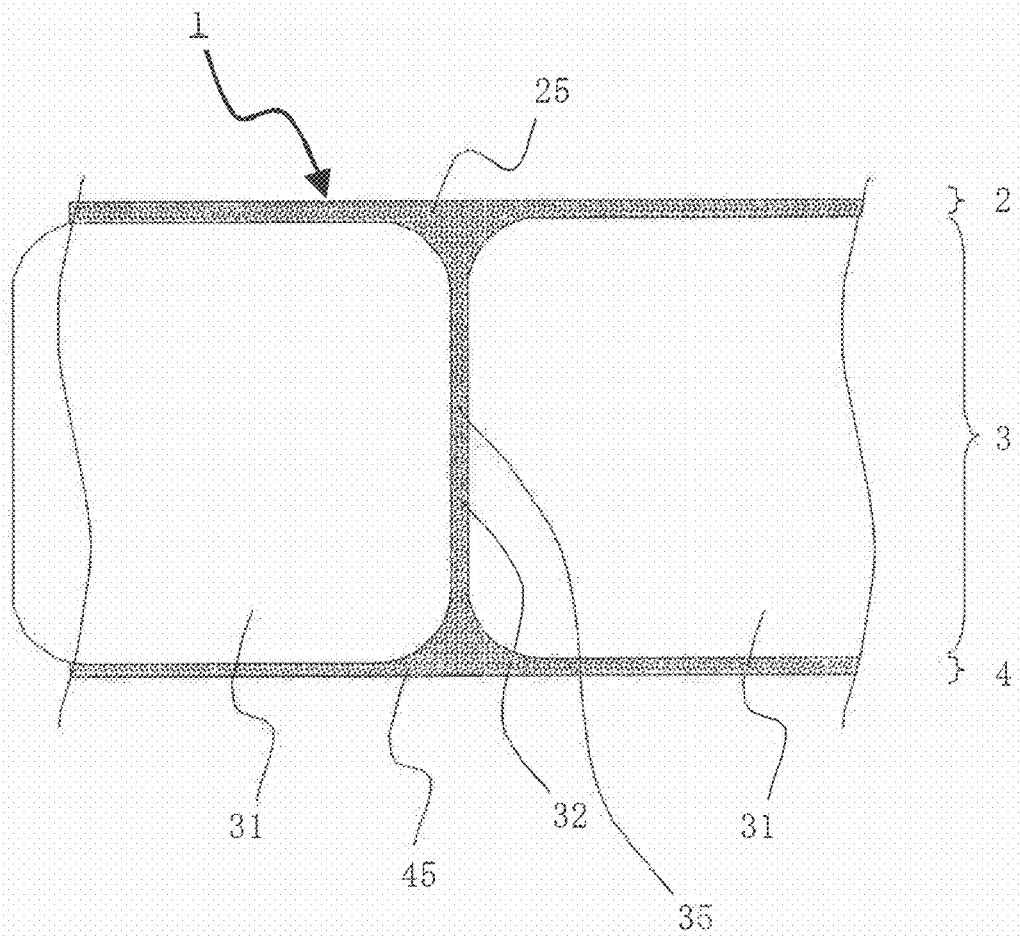

POROUS POLYIMIDE MEMBRANE AND PROCESS FOR PRODUCTION OF SAME

TECHNICAL FIELD

The present invention relates to a porous polyimide membrane and a process for production of same.

BACKGROUND ART

Porous polyimide membranes are used for separators for batteries or diaphragms for electrolytic capacitors and for dust collection, microfiltration, separation and the like. For example, Patent Document 1 discloses a porous polyimide membrane having a large number of through-holes communicating with each other, each having a diameter of from about 0.1 to 5 μm.

CITATION LIST

Patent Literature

[Patent Document 1] JP-A-11-310658

SUMMARY OF INVENTION

Technical Problem

A problem to be solved by the present invention is to provide a porous polyimide membrane having a large number of macrovoids, which as compared with conventional porous polyimide membranes, is excellent in material permeability of a gas or the like, has high porosity, is excellent in smoothness on the both surfaces and has relatively high strength and which nonetheless high porosity, is excellent in offset yield strength against a compression stress in a membrane thickness direction. Further, a problem to be solved by the present invention is to provide a process for production of same.

Solution to Problem

The present invention provides the following porous polyimide membrane and process for production of same.

[1] A porous polyimide membrane of a three-layer structure having two surface layers (a) and (b) and a macrovoid layer interposed between the surface layers (a) and (b), wherein
the macrovoid layer has a partition wall joined to the surface layers (a) and (b) and plural macrovoids surrounded by the partition wall and the surface layers (a) and (b), with an average void diameter in a membrane plane direction of from 10 to 500 μm;
each of the partition wall of the macrovoid layer and the surface layers (a) and (b) has a thickness of from 0.1 to 50 μm and has plural pores having an average pore diameter of from 0.01 to 5 μm, the pores being communicated with each other and also communicated with the macrovoids; and
the membrane has a total membrane thickness of from 5 to 500 μM and a porosity of from 70 to 95%.

[2] The porous polyimide membrane as set forth in [1], wherein the macrovoid layer has plural macrovoids having an average pore diameter in a membrane plane direction, as observed from the surface layer (a) side and/or the surface layer (b) side, of from 10 to 500 μm.

[3] The porous polyimide membrane as set forth in [1] or [2], wherein the partition wall of the macrovoid layer and the surface layers (a) and (b) have substantially the same thickness.

[4] The porous polyimide membrane as set forth in any one of [1] to [3], having a Gurley value of 100 seconds or less.

[5] The porous polyimide membrane as set forth in any one of [1] to [4], having a rate of change in the membrane thickness after applying a compression stress load of 0.5 MPa at 250° C. for 15 minutes of 5% or less.

[6] The porous polyimide membrane as set forth in any one of [1] to [5], wherein in a section when the membrane is cut vertically against the membrane plane direction, a sectional area of the macrovoids having an average pore diameter in the membrane plane direction of from 10 to 500 μm is 50% or more of a sectional area of the membrane.

[7] The porous polyimide membrane as set forth in any one of [1] to [6], wherein in a section when the porous polyimide membrane is cut vertically against the membrane plane direction, 60% or more of the macrovoids have a ratio (L/d) of a length (L) of the membrane plane direction to a length (d) of the membrane thickness direction falling within the range of from 0.5 to 3.

[8] The porous polyimide membrane as set forth in any one of [1] to [7], having a glass transition temperature of 240° C. or higher, or not having a distinct transition point at 300° C. or higher.

[9] A process for production of a porous polyimide membrane as set forth in any one of [1] to [8], including:
a step of casting a polyamic acid solution composition containing (A) a polyamic acid solution composed of from 0.3 to 60% by mass of a polyamic acid composed of a tetracarboxylic acid unit and a diamine unit and from 40 to 99.7% by mass of an organic polar solvent and (B) from 0.1 to 200 parts by mass, based on 100 parts by mass of the polyamic acid, of a polar group-containing organic compound, into a film shape and dipping the film in or bringing it into contact with a coagulating solvent containing water as an essential component to fabricate a porous membrane of a polyamic acid; and
a step of thermally treating the porous membrane of a polyamic acid obtained in the foregoing step to achieve imidation,
wherein the polar group-containing organic compound (B) is an organic compound which promotes invasion of water into a film-shaped cast material of the polyamic acid solution composition.

[10] The process for production of a porous polyimide membrane as set forth in [9], wherein the polyamic acid is obtained from at least one tetracarboxylic dianhydride selected from the group consisting of a biphenyl tetracarboxylic dianhydride and pyromellitic dianhydride and at least one diamine selected from the group consisting of a benzenediamine, a diaminodiphenyl ether and a bis(aminophenoxy)phenyl.

[11] The process for production of a porous polyimide membrane as set forth in [9] or [10], wherein the polar group-containing organic compound (B) is benzoic acid.

[12] The process for production of a porous polyimide membrane as set forth in any one of [9] to [11], wherein the polyamic acid solution composition further contains (C) from 0.1 to 100 parts by mass, based on 100 parts by mass of the polyamic acid, of a vinyl polymer.

[13] The process for production of a porous polyimide membrane as set forth in [12], wherein the vinyl polymer (C) is at least one selected from the group consisting of polyvinyl acetate, polystyrene and polymethyl methacrylate.

[14] The process for production of a porous polyimide membrane as set forth in any one of [9] to [13], wherein the coagulating solvent containing water as an essential component is water or a mixed solution of 5% by mass or more and less than 100% by mass of water and more than 0% by mass and 95% by mass or less of an organic polar solvent.

Advantageous Effects of Invention

The porous polyimide membrane of the present invention gives rise to excellent effects including:
1) The majority of a sectional structure of the membrane has a symmetric structure, and the membrane is very easily utilized in the case of its use as various flat membrane materials;
2) A large porosity can be obtained, and for example, when the membrane is used as an insulating substrate, a dielectric constant can be decreased;
3) Since the both surfaces and the support layer have through-holes extending from one surface to the other surface, filling and movement of a material are easy;
4) Since the membrane has macrovoids, a filling amount of a material can be increased;
5) The membrane has excellent smoothness of the both surfaces; and
6) Since the majority of the both surface layers and the support part has a ladder structure, the membrane is relatively high in strength as compared with a bulk density; nonetheless high porosity, has offset yield strength against a compression stress in a membrane thickness direction; is high in dimensional stability; and is small in a rate of change in the membrane thickness after applying a compression stress load of 0.5 MPa at 250° C. for 15 minutes.

Furthermore, the process for production of a porous polyimide membrane of the present invention is able to produce the porous polyimide membrane of the present invention simply and easily and efficiently.

BRIEF DESCRIPTION OF DRAWINGS

FIG. 2 is an enlarged lateral face sectional view of a preferred embodiment of a porous polyimide membrane of the present invention.

DESCRIPTION OF EMBODIMENTS

Figure 1A:
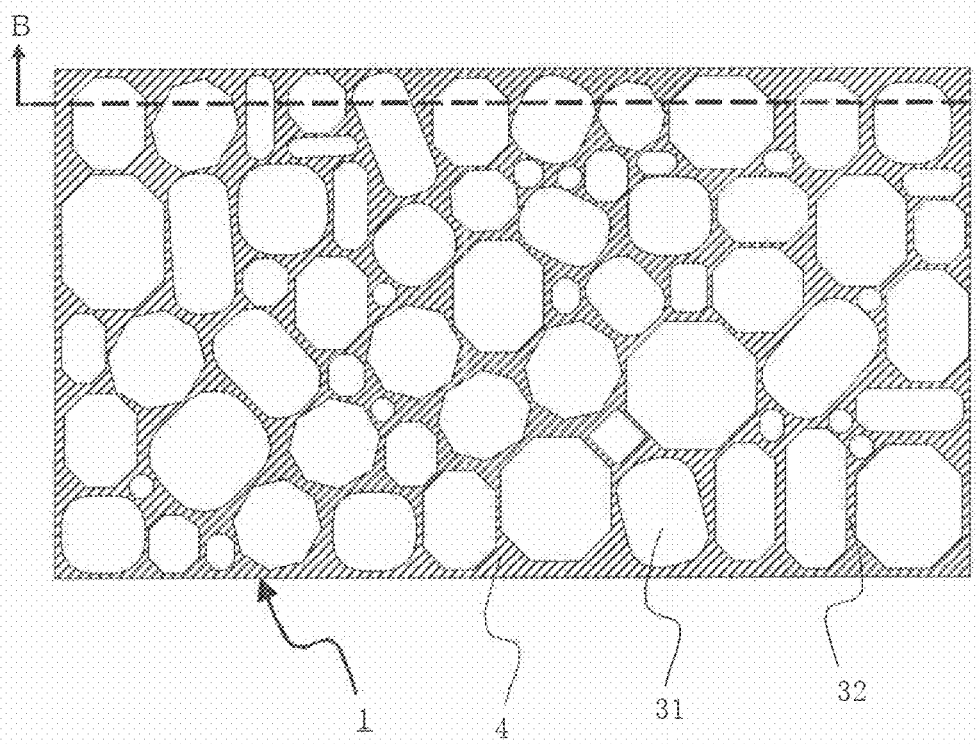
FIG. 1(a) is a planar sectional view of a preferred embodiment of a porous polyimide membrane of the present invention.
Figure 1B:
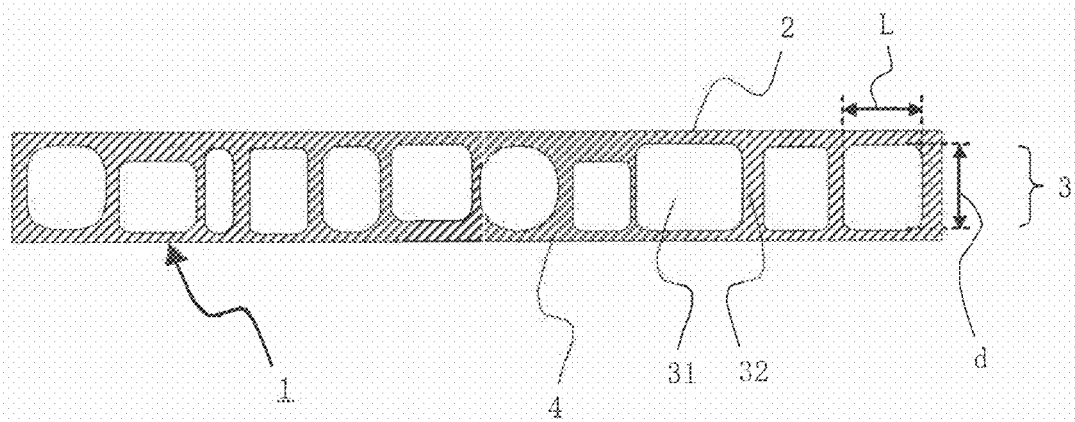
FIG. 1(b) is a B-B line sectional view of FIG. 1(a).
Figure 3:
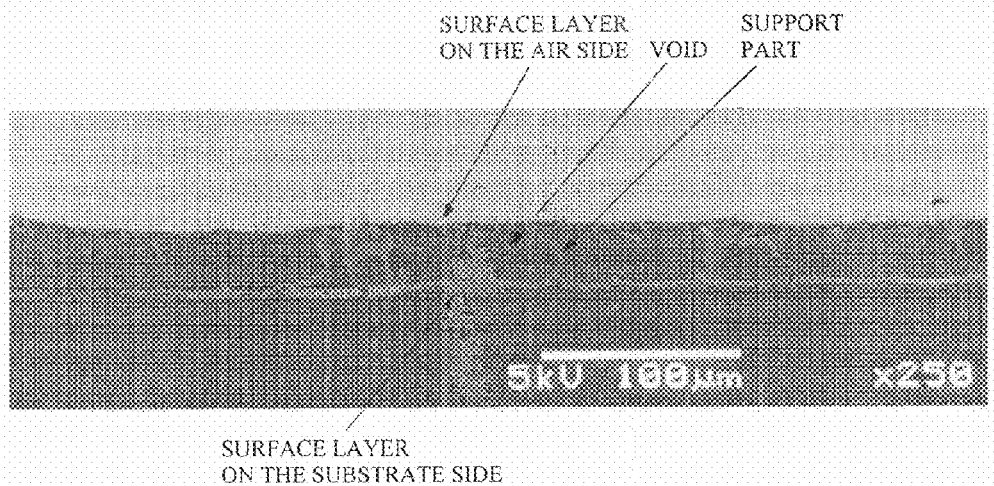
FIG. 3 is a scanning electron microscopic photograph of a lateral face section of a preferred embodiment of a porous polyimide membrane of the present invention.
Figure 4:
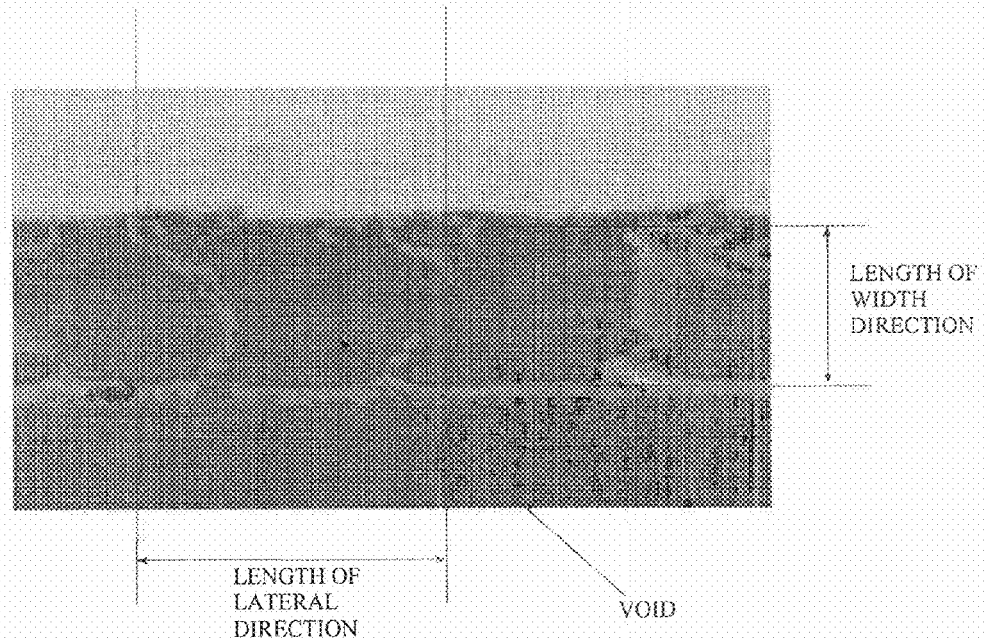
FIG. 4 is an enlarged photograph of FIG. 3.

Preferred embodiments of the porous polyimide membrane of the present invention are described by reference to the accompany drawings. FIG. 1(a) is a planar sectional view of a preferred embodiment of the porous polyimide membrane of the present invention, and FIG. 1(b) is a B-B line sectional view of FIG. 1(a). FIG. 2 is an enlarged lateral face sectional view of a preferred embodiment of the porous polyimide membrane of the present invention. FIG. 3 is a scanning electron microscopic photograph of a lateral face section of a preferred embodiment of the porous polyimide membrane of the present invention. FIG. 4 is an enlarged photograph of FIG. 3.

As shown in FIGS. 1 and 2, a porous polyimide membrane 1 of the present invention is a porous polyimide membrane of a three-layer structure having two surface layers 2 and 4 (surface layers (a) and (b)) and a macrovoid layer 3 interposed between the surface layers 2 and 4.

Each of the surface layers 2 and 4 has a thickness of from 0.1 to 50 µm, and from the viewpoint of strength of the polyimide membrane, the thickness is preferably from 0.5 to 10 µm, more preferably from 1 to 9 µm, still more preferably from 2 to 8 µm, and yet still more preferably from 2 to 7 µm. From the viewpoint of using the polyimide membrane as various flat membrane materials, it is preferable that the thicknesses of the surface layers 2 and 4 are substantially the same as each other.

Each of the surface layers 2 and 4 has plural micropores 25 and 45. An average pore diameter of each of the micropores 25 and 45 is from 0.01 to 5 µm, preferably from 0.01 to 3 µm, more preferably from 0.02 to 2 µm. Furthermore, a maximum pore diameter of each of the micropores 25 and 45 is preferably 10 µm or less, more preferably from 0.1 to 5 µm, and still more preferably from 0.1 to 3 µm. The micropores are communicated with each other and further communicated with a macrovoid 31.

In this way, since the polyimide membrane of the present invention has through-holes extending from one surface to the other surface, filling and movement of a material are easy, and excellent air permeability of a gas or the like is revealed. Meanwhile, since the average pore diameter of the micropores formed on the membrane surface is small, the polyimide membrane of the present invention is able to allow only a material with a prescribed size to pass therethrough and has a filtering function. Furthermore, since the average pore diameter of the micropores formed on the membrane surface is small, the membrane surface of the polyimide membrane of the present invention is excellent in smoothness.

The macrovoid layer 3 has the plural macrovoids 31 and a partition wall 32 partitioning the macrovoids 31 from each other. The macrovoid 31 is a space surrounded by the partition wall 32 and the surface layers 2 and 4, and an average pore diameter in a membrane plane direction is from 10 to 500 μm, preferably from 10 to 100 μm, and more preferably from 10 to 80 μm. As schematically shown in FIG. 1(*a*), a section when the macrovoid layer 3 is cut parallel to the membrane plane direction has a honeycomb structure or a structure analogous thereto, and the plural macrovoids having a prescribed pore diameter are present in a close contact state across the partition wall. That is, the polyimide membrane of the present invention has a so-called "honeycomb sandwich structure". Incidentally, the "honeycomb structure" as referred to in this specification merely means a structure in which a large number of individually divided space parts are densely populated but does not mean only a structure in which the space parts have a precisely hexagonal section.

The polyimide membrane of the present invention has a large space by the macrovoids 31 and has a high porosity. For that reason, for example, when the membrane is used as an insulating substrate, a dielectric constant can be decreased. Furthermore, when a material is filled in the voids, a filling amount of a material can be increased.

A thickness of the partition wall 32 partitioning the macrovoids 31 from each other is from 0.1 to 50 μm, and from the viewpoints of strength of the polyimide membrane 1 and communication properties of the macrovoids 31 with each other, the thickness is preferably from 1 to 15 μm, more preferably from 2 to 12 μm, still more preferably from 3 to 10 μm, and yet still more preferably from 4 to 8 μm. It is preferable that the thicknesses of the partition wall 32 and the surface layers 2 and 4 are substantially the same as each other.

Similar to the surface layers 2 and 4, the partition wall 32 has plural micropores 35. An average pore diameter of each of the micropores 35 is from 0.01 to 5 μm, preferably from 0.01 to 3 μm, more preferably from 0.02 to 2 μm. Furthermore, a maximum pore diameter of each of the micropore 35 is preferably 10 μm or less, more preferably from 0.1 to 5 μm, and still more preferably from 0.1 to 3 μm. The micropores are communicated with each other and further communicated with the macrovoid 31.

In this way, as for the polyimide membrane of the present invention, the macrovoids are communicated with each other, and filling and movement of a material are easy, and the excellent material permeability of a gas or the like is revealed. Meanwhile, since the average pore diameter of the micropores formed in the partition wall is small, the polyimide membrane of the present invention is able to confine a material in the macrovoids.

As shown in FIGS. 1(*b*) and 2 to 4, the partition wall 32 is joined to the surface layers 2 and 4. The partition wall 32 has a role to partition the macrovoids 31 from each other and also has a role as a support part for supporting the surface layers 2 and 4. For that reason, nonetheless high porosity, the polyimide membrane of the present invention is excellent in offset yield strength against a compression stress in a membrane thickness direction and high in dimensional stability.

In particular, as shown in FIGS. 3 and 4, in a section when the polyimide membrane of the present invention is cut vertically against the membrane plane direction, the partition wall 32 and the surface layers 2 and 4 are configured in a ladder shape. That is, the partition walls 32 are formed at substantially fixed intervals in a vertical direction against the membrane plane direction and joined to the surface layers 2 and 4.

From the viewpoint of material permeability, in a section when the polyimide membrane of the present invention is cut vertically against the membrane plane direction, a sectional area of the macrovoids having an average pore diameter in the membrane plane direction of from 10 to 500 μm is preferably 50% or more, more preferably 60% or more, still more preferably 70% or more, and yet still more preferably 75% or more, and preferably 98% or less, more preferably 95% or less, still more preferably 90% or less, and yet still more preferably 85% or less relative to a sectional area of the membrane.

Furthermore, from the viewpoints of material permeability, lightweight properties and structure retention properties of the membrane, in a section when the polyimide membrane of the present invention is cut vertically against the membrane plane direction, a ratio (L/d) of a length (L) of the membrane plane direction of the macrovoids having an average pore diameter in the membrane plane direction of from 10 to 500 μm to a length (d) of the membrane thickness direction is in the range of preferably from 0.5 to 3, more preferably from 0.8 to 3 in L/d, still more preferably from 1 to 3 in L/d, and yet still more preferably from 1.2 to 3 in L/d. Then, a number of the macrovoids satisfying the foregoing L/d is preferably 60% or more, more preferably 70% or more, and still more preferably from 75 to 100%. Incidentally, as shown in FIG. 4, the length (d) of the membrane thickness direction of the macrovoids is a maximum length of the membrane thickness direction of the macrovoids, and the length (L) of the membrane plane direction of the macrovoids is a maximum length of the membrane plane direction of the macrovoids.

A total membrane thickness of the polyimide membrane of the present invention is from 5 to 500 μm, and from the viewpoint of dynamic strength, the total membrane thickness is preferably 10 μm or more, more preferably 20 μm or more, and still more preferably 25 μm or more, and preferably 300 μm or less, more preferably 100 μm or less, and still more preferably 50 μm or less.

Furthermore, a porosity of the polyimide membrane of the present invention is from 70 to 95%, and from the viewpoints of material permeability, dynamic strength and structure retention properties of the membrane, the porosity is in the range of preferably from 71 to 92%, and more preferably from 71 to 85%.

Furthermore, from the viewpoint of gas permeability, a Gurley value (seconds required for allowing 100 cc of air to permeate through the membrane at a pressure of 0.879 $g/m^2$) of the polyimide membrane of the present invention is preferably 100 seconds or less, more preferably 80 seconds or less, still more preferably 60 seconds or less, and yet still more preferably 50 seconds or less. Though a lower limit value thereof is not particularly limited, it is preferably a measuring limit or more. The Gurley value can be measured in conformity with JIS P8117.

In the polyimide membrane of the present invention, a rate of change in the membrane thickness after applying a compression stress load of 0.5 MPa at 250° C. for 15 minutes is preferably 5% or less, more preferably 3% or less, and still more preferably from 0 to 1%. Furthermore, a dimensional stability in the membrane plane direction at 200° C. for 2 hours in conformity with ASTM D1204 is preferably within ±1%, more preferably within ±0.8%, and still more preferably within ±0.5%.

Furthermore, from the viewpoints of heat resistance and dimensional stability at a high temperature, it is preferable that the polyimide membrane of the present invention has a glass transition temperature of 240° C. or higher, or does not have a distinct transition point at 300° C. or higher.

The porous polyimide membrane of the present invention is a porous polyimide membrane composed mainly of a polyimide which is obtained from a tetracarboxylic dianhydride and a diamine, and preferably a porous polyimide membrane composed of a polyimide which is obtained from a tetracarboxylic dianhydride and a diamine.

As the tetracarboxylic dianhydride, an arbitrary tetracarboxylic dianhydride can be used, and it can be properly selected depending upon desired characteristics or the like. As specific examples of the tetracarboxylic dianhydride, there can be exemplified by pyromellitic dianhydride, a biphenyl tetracarboxylic dianhydride such as 3,3',4,4'-biphenyl tetracarboxylic dianhydride (s-BPDA) and 2,3,3',4'-biphenyl tetracarboxylic dianhydride (a-BPDA), oxydiphthalic dianhydride, diphenylsulfone-3,4,3',4'-tetracarboxylic dianhydride, bis(3,4-dicarboxyphenyl) sulfide dianhydride, 2,2-bis(3,4-dicarboxyphenyl)-1,1,1,3,3,3-hexafluoropropane dianhydride, 2,3,3',4'-benzophenone tetracarboxylic dianhydride, 3,3',4,4'-benzophenone tetracarboxylic dianhydride, bis(3,4-dicarboxyphenyl)methane dianhydride, 2,2-bis(3,4-dicarboxyphenyl)propane dianhydride, p-phenylene bis(trimellitic acid monoester anhydride), p-biphenylene bis(trimellitic acid monoester anhydride), m-terphenyl-3,4,3',4'-tetracarboxylic dianhydride, p-terphenyl-3,4,3',4'-tetracarboxylic dianhydride, 1,3-bis(3,4-dicarboxyphenoxy)benzene dianhydride, 1,4-bis(3,4-dicarboxyphenoxy)benzene dianhydride, 1,4-bis(3,4-dicarboxyphenoxy)biphenyl dianhydride, 2,2-bis[(3,4-dicarboxyphenoxy)phenyl]propane dianhydride, 2,3,6,7-naphthalene tetracarboxylic dianhydride, 1,4,5,8-naphthalene tetracarboxylic dianhydride, 4,4'-(2,2-hexafluoroisopropylidene) diphthalic dianhydride. Furthermore, it is also preferable to use an aromatic tetracarboxylic acid such as 2,3,3',4'-diphenylsulfone tetracarboxylic acid. These can be used singly or in combinations of two or more kinds thereof.

Of these, in particular, at least one aromatic tetracarboxylic dianhydride selected from the group consisting of a biphenyl tetracarboxylic dianhydride and pyromellitic dianhydride is preferable. As the biphenyl tetracarboxylic dianhydride, 3,3',4,4'-biphenyl tetracarboxylic dianhydride can be suitably used.

As the diamine, an arbitrary diamine can be used. As specific examples of the diamine, the following can be exemplified.

1) Benzenediamines having one benzene nucleus, such as 1,4-diaminobenzene (p-phenylenediamine), 1,3-diaminobenzene, 2,4-diaminotoluene and 2,6-diaminotoluene;

2) Diamines having two benzene nuclei, such as a diaminodiphenyl ether such as 4,4'-diaminodiphenyl ether and 3,4'-diaminodiphenyl ether, 4,4'-diaminodiphenylmethane, 3,3'-dimethyl-4,4'-diaminobiphenyl, 2,2'-dimethyl-4,4'-diaminobiphenyl, 2,2'-bis(trifluoromethyl)-4,4'-diaminobiphenyl, 3,3'-dimethyl-4,4'-diaminodiphenylmethane, 3,3'-dicarboxy-4,4'-diaminodiphenylmethane, 3,3',5,5'-tetramethyl-4,4'-diaminodiphenylmethane, bis(4-aminophenyl)sulfide, 4,4'-diaminobenzanilide, 3,3'-dichlorobenzidine, 3,3'-dimethylbenzidine, 2,2'-dimethylbenzidine, 3,3'-dimethoxybenzidine, 2,2'-dimethoxybenzidine, 3,3'-diaminodiphenyl ether, 3,4'-diaminodiphenyl ether, 4,4'-diaminodiphenyl ether, 3,3'-diaminodiphenyl sulfide, 3,4'-diaminodiphenyl sulfide, 4,4'-diaminodiphenyl sulfide, 3,3'-diaminodiphenyl sulfone, 3,4'-diaminodiphenyl sulfone, 4,4'-diaminodiphenyl sulfone, 3,3'-diaminobenzophenone, 3,3'-diamino-4,4'-dichlorobenzophenone, 3,3'-diamino-4,4'-dimethoxybenzophenone, 3,3'-diaminodiphenylmethane, 3,4'-diaminodiphenylmethane, 4,4'-diaminodiphenylmethane, 2,2-bis(3-aminophenyl)propane, 2,2-bis(4-aminophenyl)propane, 2,2-bis(3-aminophenyl)-1,1,1,3,3,3-hexafluoropropane, 2,2-bis(4-aminophenyl)-1,1,1,3,3,3-hexafluoropropane, 3,3'-diaminodiphenyl sulfoxide, 3,4'-diaminodiphenyl sulfoxide and 4,4'-diaminodiphenyl sulfoxide;

3) Diamines having three benzene nuclei, such as 1,3-bis(3-aminophenyl)benzene, 1,3-bis(4-aminophenyl)benzene, 1,4-bis(3-aminophenyl)benzene, 1,4-bis(4-aminophenyl)benzene, 1,3-bis(4-aminophenoxy)benzene, 1,4-bis(3-aminophenoxy)benzene, 1,4-bis(4-aminophenoxy)benzene, 1,3-bis(3-aminophenoxy)-4-trifluoromethylbenzene, 3,3'-diamino-4-(4-phenyl)phenoxybenzophenone, 3,3'-diamino-4,4'-di(4-phenylphenoxy)benzophenone, 1,3-bis(3-aminophenyl sulfide)benzene, 1,3-bis(4-aminophenyl sulfide)benzene, 1,4-bis(4-aminophenyl sulfide)benzene, 1,3-bis(3-aminophenyl sulfone)benzene, 1,3-bis(4-aminophenyl sulfone)benzene, 1,4-bis(4-aminophenyl sulfone)benzene, 1,3-bis[2-(4-aminophenyl)isopropyl]benzene, 1,4-bis[2-(3-aminophenyl)isopropyl]benzene and 1,4-bis[2-(4-aminophenyl)isopropyl]benzene;

4) Diamines having four benzene nuclei, such as 3,3'-bis(3-aminophenoxy)biphenyl, 3,3'-bis(4-aminophenoxy)biphenyl, 4,4'-bis(3-aminophenoxy)biphenyl, 4,4'-bis(4-aminophenoxy)biphenyl, bis[3-(3-aminophenoxy)phenyl]ether, bis[3-(4-aminophenoxy)phenyl]ether, bis[4-(3-aminophenoxy)phenyl]ether, bis[4-(4-aminophenoxy)phenyl]ether, bis[3-(3-aminophenoxy)phenyl]ketone, bis[3-(4-aminophenoxy)phenyl]ketone, bis[4-(3-aminophenoxy)phenyl]ketone, bis[4-(4-aminophenoxy)phenyl]ketone, bis[3-(3-aminophenoxy)phenyl]sulfide, bis[3-(4-aminophenoxy)phenyl]sulfide, bis[4-(3-aminophenoxy)phenyl]sulfide, bis[4-(4-aminophenoxy)phenyl]sulfide, bis[3-(3-aminophenoxy)phenyl]sulfone, bis[3-(4-aminophenoxy)phenyl]sulfone, bis[4-(3-aminophenoxy)phenyl]sulfone, bis[4-(4-aminophenoxy)phenyl]sulfone, bis[3-(3-aminophenoxy)phenyl]methane, bis[3-(4-aminophenoxy)phenyl]methane, bis[4-(3-aminophenoxy)phenyl]methane, bis[4-(4-aminophenoxy)phenyl]methane, 2,2-bis[3-(3-aminophenoxy)phenyl]propane, 2,2-bis[3-(4-aminophenoxy)phenyl]propane, 2,2-bis[4-(3-aminophenoxy)phenyl]propane, 2,2-bis[4-(4-aminophenoxy)phenyl]propane, 2,2-bis[3-(3-aminophenoxy)phenyl]-1,1,1,3,3,3-hexafluoropropane, 2,2-bis[3-(4-aminophenoxy)phenyl]-1,1,1,3,3,3-hexafluoropropane, 2,2-bis[4-(3-aminophenoxy)phenyl]-1,1,1,3,3,3-hexafluoropropane and 2,2-bis[4-(4-aminophenoxy)phenyl]-1,1,1,3,3,3-hexafluoropropane.

These can be used singly or in combinations of two or more kinds thereof. The diamine to be used can be properly selected depending upon desired characteristics or the like.

Of these, an aromatic diamine compound is preferable, and 3,3'-diaminodiphenyl ether, 3,4'-diaminodiphenyl ether, 4,4'-diaminodiphenyl ether, p-phenylenediamine, 1,3-bis(3-aminophenyl)benzene, 1,3-bis(4-aminophenyl)benzene, 1,4-bis(3-aminophenyl)benzene, 1,4-bis(4-aminophenyl)benzene, 1,3-bis(4-aminophenoxy)benzene and 1,4-bis(3-aminophenoxy)benzene can be suitably used. In particular, at least one diamine selected from the group consisting of a benzenediamine, a diaminodiphenyl ether and a bis(aminophenoxy) phenyl is preferable.

From the viewpoints of heat resistance and dimensional stability at a high temperature, it is preferable that the porous polyimide membrane is formed of a polyimide obtained by a combination of a tetracarboxylic dianhydride and a diamine, which has a glass transition temperature of 240° C. or higher, or does not have a distinct transition point at 300° C. or higher.

From the viewpoints of heat resistance and dimensional stability at a high temperature, it is preferable that the porous polyimide membrane of the present invention is a porous polyimide film composed of the following aromatic polyimide.

(i) Aromatic polyimides composed of at least one tetracarboxylic acid unit selected from the group consisting of a biphenyl tetracarboxylic acid unit and a pyromellitic acid unit and an aromatic diamine unit;

(ii) Aromatic polyimides composed of a tetracarboxylic acid unit and at least one aromatic diamine unit selected from the group consisting of a benzenediamine unit, a diaminodiphenyl ether unit and a bis(aminophenoxy)phenyl unit; and/or (iii) Aromatic polyimides composed of at least one tetracarboxylic acid unit selected from the group consisting of a biphenyl tetracarboxylic acid unit and a pyromellitic acid unit and at least one aromatic diamine unit selected from the group consisting of a benzenediamine unit, a diaminodiphenyl ether unit and a bis(aminophenoxy)phenyl unit.

Next, a process for production of a porous polyimide membrane of the present invention is described.

The process for production of a porous polyimide membrane of the present invention includes a step of casting a polyamic acid solution composition containing (A) a polyamic acid solution composed of from 0.3 to 60% by mass of a polyamic acid composed of a tetracarboxylic acid unit and a diamine unit and from 40 to 99.7% by mass of an organic polar solvent and (B) from 0.1 to 200 parts by mass, based on 100 parts by mass of the polyamic acid, of a polar group-containing organic compound, into a film shape and dipping the film in or bringing it into contact with a coagulating solvent containing water as an essential component to fabricate a porous membrane of a polyamic acid; and a step of thermally treating the porous membrane of a polyamic acid obtained in the foregoing step to achieve imidation. Here, the polar group-containing organic compound (B) is an organic compound which promotes invasion of water into a film-shaped cast material of the polyamic acid solution composition.

The polyamic acid is composed of a tetracarboxylic acid unit and a diamine unit, and it is a polyimide precursor or a polyimide precursor obtained by partial imidation of the same. The polyamic acid can be obtained by polymerizing a tetracarboxylic dianhydride and a diamine. The polyamic acid can be converted into a polyimide by cyclization through thermally imidation or chemical imidation. An imidization ratio of the polyimide in the present invention is about 80% or more, preferably 85% or more, more preferably 90% or more, and still more preferably 95% or more.

As a solvent for polymerizing the polyamic acid, an arbitrary organic polar solvent can be used, and an organic solvent, such as p-chlorophenol, o-chlorophenol, N-methyl-2-pyrrolidone (NMP), pyridine, N,N-dimethylacetamide (DMAc), N,N-dimethylformamide, dimethyl sulfoxide, tetramethylurea, phenol and cresol, can be used. In particular, N-methyl-2-pyrrolidone (NMP) or N,N-dimethylacetamide (DMAc) can be preferably used. As the tetracarboxylic dianhydride and the diamine, those described above can be preferably used.

The polyamic acid can be produced by an arbitrary method by using a tetracarboxylic dianhydride, a diamine, the foregoing organic polar solvent and the like. For example, the polyamic acid solution can be produced by allowing substantially equimolar amounts of the tetracarboxylic dianhydride and the diamine to react at a temperature of preferably not higher than about 100° C., more preferably not higher than 80° C., still more preferably from 0 to 60° C., and yet still more preferably from 20 to 60° C. for preferably about 0.2 hours or more, and more preferably from 0.3 to 60 hours.

When the polyamic acid solution is produced, for the purpose of adjusting the molecular weight, an arbitrary molecular weight modifying component may be added to a reaction solution.

A logarithmic viscosity of the polyamic acid (at 30° C., concentration: 0.5 g/100 mL, solvent: NMP) may be a viscosity at which the porous polyimide membrane of the present invention can be produced. In the process of the present invention, it is preferable to use a polyamic acid in which the logarithmic viscosity is preferably 0.3 or more, and more preferably from 0.5 to 7.

As for the polyamic acid, even when a part of an amic acid is imidated, such can be used within the range where it does not influence the present invention.

The polyamic acid solution (A) is composed of from 0.3 to 60% by mass of a polyamic acid and from 40 to 99.7% by mass of an organic polar solvent. When the content of the polyamic acid is less than 0.3% by mass, the film strength at the time of fabricating a porous polyimide membrane is lowered, whereas when it exceeds 60% by mass, the material permeability of the porous polyimide membrane is lowered. The content of the polyamic acid in the polyamic acid solution (A) is preferably from 1 to 30% by mass, more preferably from 2 to 15% by mass, and still more preferably from 5 to 10% by mass, and the content of the organic polar solvent in the polyamic acid solution (A) is preferably from 70 to 99% by mass, more preferably from 85 to 98% by mass, and still more preferably from 90 to 95% by mass.

The polyamic acid solution (A) may be a solution obtained by a polycondensation reaction of a tetracarboxylic dianhydride and a diamine in the presence of an organic polar solvent, or may be a solution obtained by dissolving a polyamic acid in an organic polar solvent.

The polyamic acid solution composition contains the polyamic acid solution (A) and the polar group-containing organic compound (B).

The polar group-containing organic compound (B) is an organic compound which promotes invasion of water into a film-shaped cast material of the polyamic acid solution composition. By promoting invasion of water into a film-shaped cast material of the polyamic acid solution composition, macrovoids having an average pore diameter of from 10 to 500 μm can be formed in the polyimide membrane.

The polar group-containing organic compound (B) may be a compound so far as in the step of dipping the film-shaped cast material of the polyamic acid solution composition in a coagulating bath, there is recognized such an effect that coagulation of the polyamic acid is promoted as compared with a coagulating process of a polyamic acid in a polyamic acid solution composition not containing the polar group-containing organic compound (B), and in particular, a compound having an effect for rapidly promoting coagulation in a membrane thickness direction from the face coming into contact with the coagulating bath into the inside is preferable. Accordingly, in view of the foregoing characteristics, the polar group-containing organic compound (B) is preferably a compound which does not react or hardly reacts with the polyamic acid.

As the polar group-containing organic compound (B), there can be exemplified by an organic compound having a carboxyl group such as benzoic acid and phthalic acid, an organic compound having a hydroxyl group and an organic compound having a sulfonic group. These can be used alone or in combinations of two or more kinds thereof. In particular, as the polar group-containing organic compound, a carboxyl group-containing organic compound such as benzoic acid and phthalic acid is preferable.

In the polyamic acid solution composition, from the viewpoint of formation of macrovoids, a content of the polar group-containing organic compound (B) is from 0.1 to 200 parts by mass, preferably from 1 to 150 parts by mass, more preferably from 10 to 100 parts by bass, and still more preferably from 20 to 70 parts by mass based on 100 parts by mass of the polyamic acid.

Furthermore, from the viewpoint of material permeability, it is preferable that the polyamic acid solution composition further contains (C) a vinyl polymer. The vinyl polymer (C) is provided with at least one of the following characteristic features (C1) to (C4), preferably the following characteristic features (C1) to (C3), and more preferably all of the following characteristic features (C1) to (C4).

(C1) The vinyl polymer (C) is insoluble or sparingly soluble in water, the coagulating solvent and/or the organic polar solvent.
(C2) The vinyl polymer (C) is decomposed in a thermal imidation step.
(C3) The vinyl polymer (C) is homogeneously suspended in the polyamic acid solution composition.
(C4) The vinyl polymer (C) is incompatible with the polyamic acid.

Though the action mechanism of the vinyl polymer (C) is not elucidated yet, it may be considered as follows.

c1) The vinyl polymer (C) remains as an incompatible material in the polyamic acid. At the time of fabrication of a porous membrane of a polyamic acid by dipping or bringing into contact with the coagulating solvent, a part or the whole of this vinyl polymer (C) elutes into the coagulating bath and is further decomposed in the step of thermal imidation. As a result, in the partition wall of the macrovoid layer and the surface layers (a) and (b) of the polyimide membrane, a portion where the removed vinyl polymer (C) has existed forms micropores, whereby material permeability of the polyimide membrane is enhanced.

c2) By giving influences such as promotion of coagulation of the polyamic acid solution composition or the like to the coagulating step, material permeability of the polyimide membrane is enhanced.

The vinyl polymer (C) is preferably at least one selected from the group consisting of polyvinyl acetate, polystyrene and polymethyl methacrylate. These can be used singly or in combinations of two or more kinds thereof.

In the polyamic acid solution composition, from the viewpoint of material permeability, a content of the vinyl polymer (C) is preferably from 0.1 to 100 parts by mass, more preferably from 1 to 30 parts by mass, still more preferably from 2 to 20 parts by mass, and yet still more preferably from 3 to 12 parts by mass based on 100 parts by mass of the polyamic acid.

When the vinyl polymer (C) is added to the polyamic acid solution composition, the vinyl polymer (C) can be added in a state of a raw material as is, or in a form of a dissolved solution or suspended solution.

Incidentally, at the time of production of a polyamic acid solution composition, there may be the case where the solution becomes in a suspended state. However, so far as the homogenous state can be kept by stirring for a sufficient period of time, such a solution can be used for the production of the polyimide of the present invention.

Furthermore, from the viewpoints of easiness of casting and film strength, a solution viscosity of the polyamic acid solution composition is preferably from 10 to 10,000 poises (1 to 1,000 Pa·s), more preferably from 100 to 3,000 poises (10 to 300 Pa·s), still more preferably from 200 to 2,000 poises (20 to 200 Pa·s), and yet still more preferably from 300 to 1,000 poises (30 to 100 Pa·s).

(Casting)

In the process for production of a porous polyimide of the present invention, first of all, the polyamic acid solution composition is cast into a film shape. The casting method is not particularly limited, and for example, the polyamic acid solution composition can be cast into a film shape by using the polyamic acid solution composition as a dope solution and casting it on a glass plate, a stainless steel plate or the like by using a blade, a T-die or the like. Also, an individual piece-formed or long cast material can be produced by intermittently or continuously casting the polyamic acid solution composition into a film shape onto a continuously movable belt. The belt may be one which is not influenced by the polyamic acid solution composition and the coagulating solution, and a belt made of a metal such as stainless steel or made of a resin such as polytetrafluoroethylene can be used. Furthermore, the polyamic acid solution composition which has been molded into a film shape from a T-die can also be thrown into the coagulating bath as it is. Furthermore, if desired, a gas containing a water vapor or the like (e.g., air, an inert gas) may be brought into contact with one surface or both surfaces of the cast material.

(Fabrication of Porous Membrane of Polyamic Acid)

Subsequently, the cast material is dipped in or brought into contact with a coagulating solvent containing water as an essential component to deposit the polyamic acid, thereby making the cast material porous. There is thus fabricated a porous membrane of the polyamic acid. The obtained porous membrane of the polyamic acid is washed and/or dried depending upon the necessity.

As the coagulating solvent containing water as an essential component, water or a mixed solution of 5% by mass or more and less than 100% by mass of water and more than 0% by mass and 95% by mass or less of an organic polar solvent can be used. From the viewpoints of safety against a fire or the like, production costs and security of homogeneity of the obtained membrane, it is preferable to use a coagulating solvent containing water and an organic polar solvent. Examples of the organic polar solvent which may be contained in the coagulating solvent include alcohols such as ethanol and methanol, acetone and the like, which are a poor solvent of the polyamic acid.

When the coagulating solvent is a mixed solution of water and an organic polar solvent, a content of water in 100% by mass of the coagulating solvent is preferably 5% by mass or more and less than 100% by mass, more preferably 20% by mass or more and less than 100% by mass, still more preferably from 30% by mass to 95% by mass, and yet still more preferably from 45 to 90% by mass. A content of the organic polar solvent in 100% by mass of the coagulating solvent is preferably more than 0% by mass and 95% by mass or less, more preferably more than 0% by mass and 80% by mass or less, still more preferably from 5 to 70% by mass, and yet still more preferably from 10 to 55% by mass.

A temperature of the coagulating solvent may be properly selected and used depending upon the purpose, and for example, it is in the range of from −30 to 70° C., preferably from 0 to 60° C., and more from 10 to 50° C.

(Imidation)

Subsequently, the obtained porous membrane of the polyamic acid is thermally treated to achieve imidation, thereby producing a porous polyimide membrane. As the imidation, there can be exemplified by a thermal imidation treatment, a chemical imidation treatment.

For example, the thermal imidation treatment can be carried out by fixing the porous membrane of the polyamic acid to the support using a pin, a chuck, a pinch roll or the like such that the smoothness is not impaired by heat shrinkage and heating it in the air. It is preferable to perform the reaction by properly selecting a reaction condition from a heating temperature of from 280 to 600° C., and preferably from 350 to 550° C. and a heating time of from 5 to 120 minutes, and preferably from 6 to 60 minutes.

Incidentally, when the polyamic acid solution composition containing the vinyl polymer (C) is used, it is preferable to achieve thermal imidation by heating the porous membrane of the polyamic acid at a thermal decomposition initiating temperature of the vinyl polymer (C) or higher. The thermal decomposition initiating temperature of the vinyl polymer (C) can be, for example, measured in air under a condition of 10° C./min using a thermogravimetric analyzer (TGA).

The chemical imidation treatment is carried out using an aliphatic anhydride or an aromatic acid anhydride as a dehydrating agent in the presence of a tertiary amine such as triethylamine and the like, as a catalyst. Furthermore, the description of JP-A-4-339835 may be made herein by reference, and imidazole, benzimidazole or a substituted derivative thereof may also be used.

When the porous polyimide membrane of the present invention is produced through the polyamic acid solution or polyimide solution, it is possible to properly design a porosity, a membrane thickness, an average pore diameter of the surface, a maximum pore diameter, an average pore diameter of the central part and the like by properly selecting the kind of the polymer to be used; the polymer concentration, the viscosity, the organic solution and the like of the polymer solution; and also a coagulation condition (e.g., the kind of a solvent displacement rate adjusting layer, the temperature, the coagulating solvent) and the like.

The porous polyimide membrane of the present invention may also be subjected to a surface treatment of membrane by subjecting at least one surface to a corona discharge treatment, a plasma discharge treatment such as low-temperature plasma or atmospheric pressure plasma discharge, chemical etching treatment or the like. Furthermore, the surface layers (a) and/or (b) may be subjected to facing. By such a treatment, the material permeability, surface pore diameter and wettability of the membrane can be controlled.

Since the porous polyimide is excellent in material permeability of a gas or the like, it can be suitably used for applications such as a gas filter, a liquid filter and a breathing component.

EXAMPLES

The present invention is hereunder described in more detail with reference to the following Examples, but it should not be construed that the present invention is limited to these Examples.
(Evaluation of Porous Polyimide Membrane)
1) Membrane Thickness:
The membrane thickness was measured by a contact-type thickness meter.

2) Gas Permeability:
The Gurley value (seconds required for allowing 100 cc of air to permeate through the membrane at a pressure of 0.879 $g/m^2$) was measured in conformity with JIS P8117.
3) Dimensional Stability:
The dimensional stability was measured under a condition at 200° C. for 2 hours in conformity with ASTM D1204.
4) Average Pore Diameter of Surface:
With respective to 200 or more openings, a pore area was measured from a scanning electrode microscopic photograph of the porous film surface, and on the assumption that the pore shape is a true circle, the average pore diameter was determined by calculation from an average value of the pore area according to the following expression (1):

$$\text{Average pore diameter} = 2 \times (Sa/\pi)^{1/2} \quad (1)$$

wherein Sa means an average value of the pore area.
5) Maximum Pore Diameter of Surface:
With respective to 200 or more openings, a pore area was measured from a scanning electrode microscopic photograph of the porous film surface, and on the assumption that the pore shape is a true circle, the diameter was calculated, and its maximum value was defined as a maximum pore diameter.
6) Porosity:
The membrane thickness and mass of the porous film having been cut out in a prescribed size were measured, and the porosity was determined from a basis mass according to the following expression (2):

$$\text{Porosity} = S \times d \times D/W \times 100 \quad (2)$$

wherein S means an area of the porous film; d means a membrane thickness; w means a measured mass; and D means a density of the polyimide. The density of the polyimide is defined as 1.34 $g/cm^3$.
7) Glass Transition Temperature (° C.):
A dynamic viscoelasticity was measured using a solid viscoelasticity analyzer under a condition in a tensile mode at a frequency of 10 Hz and a strain of 2% in a nitrogen gas atmosphere, and in its temperature dispersion profile, a temperature at which a loss tangent showed a maximum value was defined as the glass transition temperature.
8) Solution Viscosity:
The solution viscosity was measured using an E-type rotary viscometer. The measurement procedures are shown below.
(i) A polyamic acid solution prepared in each of Referential Examples was charged in a closed vessel, which was then kept in a thermostat at 30° C. for 10 hours,
(ii) By using an E-type viscometer (cone plate type rotary viscometer for high-viscosity use (EHD type), manufactured by Tokyo Keiki Inc., cone rotor: 1°34'), the polyamic acid solution prepared in (i) was used as a measurement solution and measured under a condition at a temperature of 30±0.1° C. The measurement was carried out three times, and an average value was employed. In the case where a scattering of 5% or more was seen in the measurement points, the measurement was carried out additionally two times, and an average value of five points was employed.
9) Compression Stress Load Test of 0.5 MPa at 250° C. for 15 Minutes:
A membrane to be measured was cut out into a regular square of 3 cm in square, nine points were marked in a lattice form by a marker pen, and a membrane thickness was measured by a contact type thickness meter. Subsequently, the membrane subjective to the measurement was compressed using a high precision hot press that is a compression board having a parallel degree of less than ±10 μm and temperature distribution of ±1° C. under a condition at 250° C. for 15 minutes at 0.5 MPa. Subsequently, the membrane was allowed to stand on an SUS plate at room temperature for 30 minutes, and thereafter, the membrane thickness of each of the marked portions was measured by a contact type membrane thickness meter. A rate of change in the membrane thickness before and after the compression in the nine points was determined according to the following expression (3). An average value in the nine points was defined as the rate of change in the membrane thickness.

[Rate of change in membrane thickness(%)]=[1−
{(Membrane thickness after compression)/
(Membrane thickness before compression)}]×
100     (3)

Referential Example 1

(Preparation of Polyamic Acid Solution Composition A)

In a 500-mL separable flask, N-methyl-2-pyrrolidone (NMP) was used as a solvent, and 3,3',4,4'-biphenyltetracarboxylic dianhydride (s-BPDA) as an acid anhydride and 1,4-bis(4-aminophenyl)benzene (TPE-Q) as a diamine were weighed in a molar ratio of substantially 1 and in a polymer concentration of 6% by mass and thrown. Thereafter, the flask was covered by a separable cover installed with a stirring blade, a nitrogen-introducing tube and an exhaust tube, and stirring was started. After a lapse of 23 hours, benzoic acid in an amount of 30 parts by mass based on 100 parts by mass of the polyamic acid and 3,3',4,4'-biphenyltetracarboxylic acid in an amount of 1 part by mass based on 100 parts by mass of the polyamic acid were added in the flask, and the stirring operation was continued. After a lapse of additional 25 hours, an ethyl acetate solution containing 50% by mass of polyvinyl acetate in an amount of 10 parts by mass based on 100 parts by mass of the polyamic acid (corresponding to 5 parts by mass of polyvinyl acetate based on 100 parts by mass of the polyamic acid) was added in the flask, and the stirring operation was continued. After a lapse of 38 hours, the stirring was stopped, and a dope within the flask was filtered by a pressure filter (filter paper, manufactured by Advantec Mfs, Inc., filter paper for use in viscous liquid: No. 60), thereby obtaining a polyamic acid solution composition A. The solution composition A was a viscous suspension liquid, and its viscosity was 540 poises (54 Pa·s) (at 25° C.).

Referential Examples 2 to 9

(Preparation of Polyamic Acid Solution Compositions B to I)

Polyamic acid solution compositions B to I were obtained in the same manner as in Referential Example 1, except for changing the acid component, the diamine component, the addition amounts of benzoic acid and polyvinyl acetate and the polymer concentration as shown in Table 1. The solution compositions B to I were a viscous suspension liquid.

In Table 1, the diamine component "ODA" used in the preparation of Referential Examples 6 to 9 means 4,4'-diaminodiphenyl ether.

Referential Examples 10 to 14

(Preparation of Polyamic Acid Solution Compositions J to N)

Polyamic acid solution compositions J to N were obtained in the same manner as in Referential Example 1, except for not adding benzoic acid and changing the acid component, the diamine component, the addition amount of polyvinyl acetate and the polymer concentration as shown in Table 1. The solution compositions J to N were a viscous suspension liquid.

Example 1

The polyamic acid solution composition A prepared in Referential Example 1 was uniformly cast and coated in a thickness of about 150 μm on a stainless steel-made substrate of 20 cm in square, the surface of which had been mirror-polished, at room temperature by using a table-top automatic coater. Thereafter, the resultant was allowed to stand in the air at a temperature of 23° C. and a humidity of 40% for 90 seconds, and thereafter, the whole of the substrate was thrown into a coagulating bath (80 parts by mass of water/20 parts by mass of NMP at room temperature). After throwing, the resultant was allowed to stand for 8 minutes, thereby depositing a polyamic acid membrane on the substrate. Thereafter, the substrate was taken out from the bath, and the polyamic acid membrane deposited on the substrate was peeled off and then dipped in pure water for 3 minutes, thereby obtaining a polyamic acid membrane. This polyamic acid membrane was dried in the air at a temperature of 23° C. and a humidity of 40% and then stuck onto a pin tenter of 10 cm in square, followed by setting in an electric furnace. The resultant was thermally treated in a temperature profile of heating to 360° C. at a temperature rise rate of about 10° C./min and then keeping for 10 minutes as it was, thereby obtaining a porous polyimide membrane.

The obtained porous polyimide membrane had a membrane thickness of 49 μm, a porosity of 76% and a Gurley value of 25 seconds. The results are shown in Table 2.

A section of the porous polyimide membrane was observed by a scanning electron microscope. As a result, a large number of macrovoids having a length in the membrane lateral direction of 10 μm or more could be observed.

It could be observed that in voids having a length in the lateral direction of 5 μm or more, a number of voids having a ratio (L/d) of a length (L) of the lateral direction to a length (d) of the membrane thickness direction falling within the range of from 0.5 to 3 was 75% or more.

It could be observed that the porous polyimide membrane had a large number of macrovoids having a length in the membrane lateral direction of 10 μm or more and that a sectional area thereof was 75% or more of the total sectional area.

The glass transition temperature of the porous polyimide membrane was about 290° C., and its dimensional stability was within 1% at 200° C. The rate of change in the membrane thickness after applying a compression stress load of 0.5 MPa at 250° C. for 15 minutes was 1% or less.

Furthermore, the surface of the porous polyimide membrane was observed by a scanning electron microscope. As a result, it was confirmed that the porous polyimide membrane had a porous structure having a large number of pores communicating with each other on the surface on the substrate side, the average pore diameter of the surface was 0.18 μm, and the maximum pore diameter was 10 μm or less.

Examples 2 to 11

Porous polyimide membranes were obtained in the same manner as in Example 1, except for changing the kind of the polymer solution and the composition of the coagulating bath as shown in Table 2.

The membrane thickness, porosity and air permeability (Gurley value) of each of the obtained porous polyimide membranes were measured. The results are shown in Table 2.

A section of each of the porous polyimide membranes was observed by a scanning electron microscope. As a result, in all of the porous polyimide membranes, plural macrovoids could be observed.

It could be observed that in voids having a length in the lateral direction of 5 μm or more, a number of voids having a ratio (L/d) of a length (L) of the lateral direction to a length (d) of the membrane thickness direction falling within the range of from 0.5 to 3 was 75% or more.

It could be observed that a sectional area of voids having a length in the membrane lateral direction of 10 μm or more was 70% or more of the total sectional area.

In each of the porous polyimide membranes, the dimensional stability was within 1% at 200° C., and the rate of change in the membrane thickness after applying a compression stress load of 0.5 MPa at 250° C. for 15 minutes was 0.8% or less.

Example 12

A porous polyimide membrane was obtained in the same manner as in Example 1, except for uniformly casting and coating the polyamic acid solution composition I as prepared in Referential Example 9 in a thickness of about 350 μm.

The membrane thickness, porosity and air permeability (Gurley value) of the obtained porous polyimide membrane were measured. The results are shown in Table 2.

A section of the porous polyimide membrane was observed by a scanning electron microscope. As a result, a large number of macrovoids having a length in the membrane lateral direction of 200 μm or more could be observed.

It could be observed that in voids having a length in the lateral direction of 5 μm or more, a number of voids having a ratio (L/d) of a length (L) of the lateral direction to a length (d) of the membrane thickness direction falling within the range of from 0.5 to 3 was 75% or more.

It could be observed that the porous polyimide membrane had a large number of macrovoids having a length in the membrane lateral direction of 200 μm or more and that a sectional area thereof was 75% or more of the total sectional area.

The glass transition temperature of the porous polyimide membrane was about 285° C., and its dimensional stability was within 1% at 200° C. The rate of change in the membrane thickness after applying a compression stress load of 0.5 MPa at 250° C. for 15 minutes was 1% or less.

Furthermore, the surface of the porous polyimide membrane was observed by a scanning electron microscope. As a result, it was confirmed that the porous polyimide membrane had a porous structure having a large number of pores communicating with each other on the surface on the substrate side, the average pore diameter of the surface was 0.38 μm, and the maximum pore diameter was 10 μm or less.

With respect to each of the porous polyimide membranes obtained in Examples 1 to 12, the surface and section of the membrane were observed using a scanning electron microscope and an optical microscope. As representatives thereof, scanning electron microscopic photographs of the porous polyimide membranes obtained in Examples 4, 7, 9 and 12 are shown in FIGS. 5 to 12 and 14 to 18. Also, an optical microscopic photograph of the porous polyimide membrane obtained in Example 8 is shown in FIG. 13. The surface and section of each of the porous polyimide membranes obtained in other Examples were the same as those in these Examples.

Figure 5:
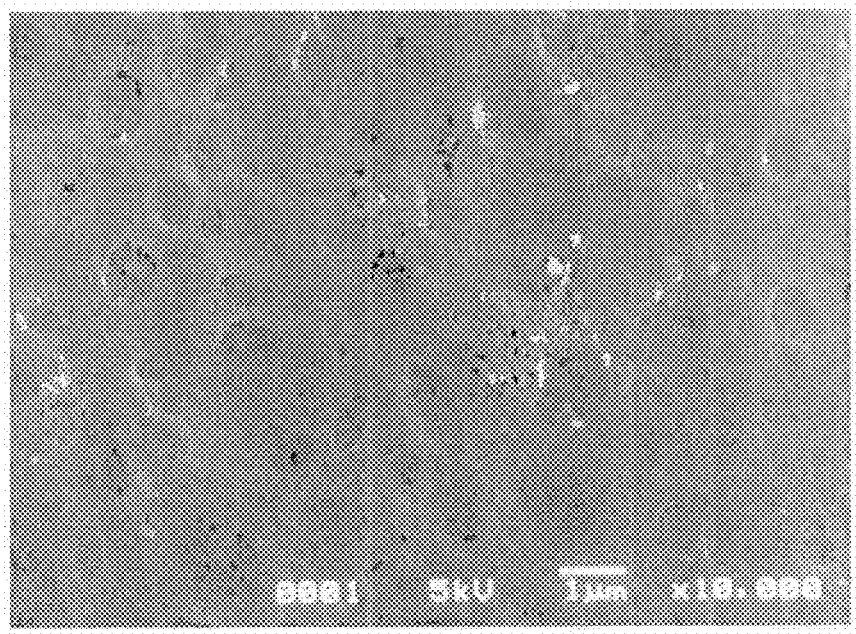
FIG. 5 is a scanning electron microscopic photograph of a surface on the air side of a porous polyimide membrane of Example 4.
Figure 6:
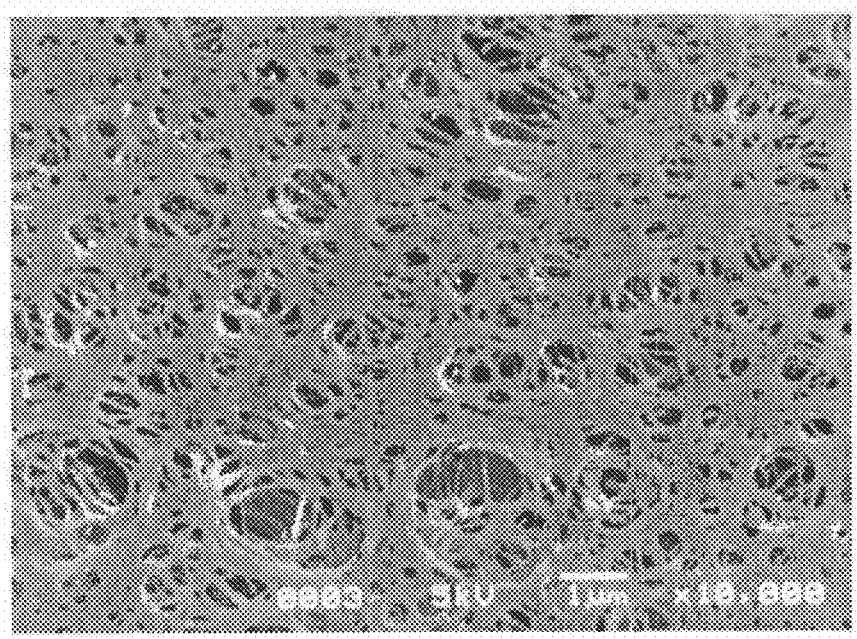
FIG. 6 is a scanning electron microscopic photograph of a surface on the substrate side of a porous polyimide membrane of Example 4.
Figure 7:
FIG. 7 is a scanning electron microscopic photograph of a lateral face section of a porous polyimide membrane of Example 4.
Figure 8:
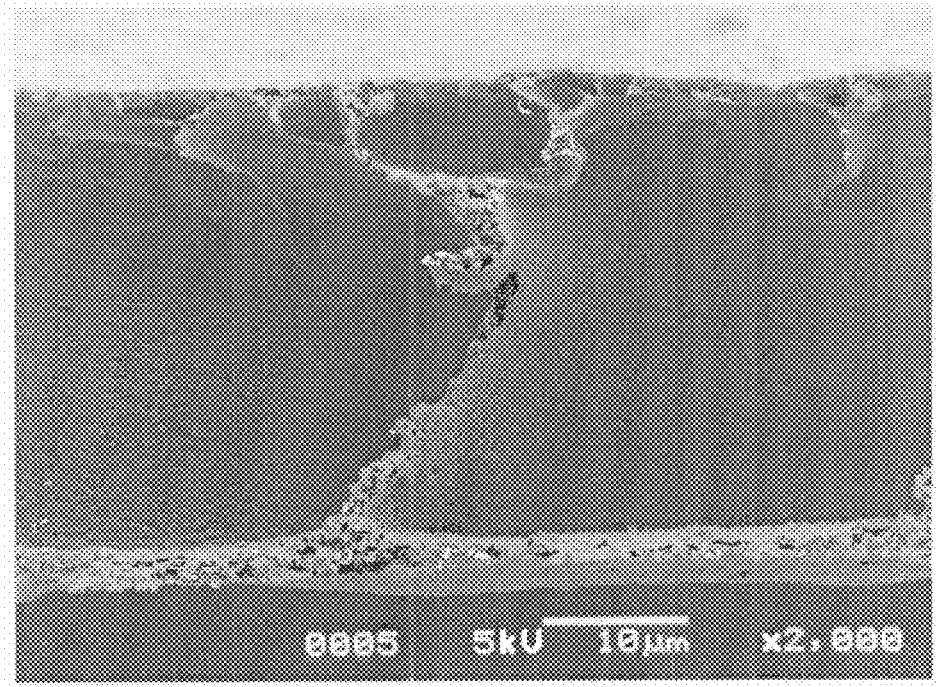
FIG. 8 is an enlarged photograph of FIG. 7.

Scanning electron microscopic photographs of the porous polyimide membrane obtained in Example 4 are shown in FIGS. 5 to 8. FIG. 5 is a scanning electron microscopic photograph (magnification: 10,000) of the surface of the porous polyimide membrane on the air side opposite to the stainless steel-made substrate; FIG. 6 is a scanning electron microscopic photograph (magnification: 10,000) of the surface of the porous polyimide membrane on the stainless steel-made substrate side; FIG. 7 is a scanning electron microscopic photograph (magnification: 250) of the lateral face section; and FIG. 8 is an enlarged photograph (magnification: 2,000) of FIG. 7.

As is clear from FIG. 5, a large number of pores having a diameter of 0.3 μm or less could be observed on the surface on the air side. Furthermore, as is clear from FIG. 6, a large number of pores of from about 0.1 μm to about 5 μm could be observed on the surface on the substrate side. Furthermore, as is clear from FIG. 7, it could be observed that a layer of the surface on the air side, a layer of the surface on the substrate side and a partition wall supporting the both surfaces and partitioning the macrovoids from each other were formed and that the both surfaces and the partition wall (support part) were joined substantially in a ladder shape. Incidentally, in FIG. 7, the upper side is the layer of the surface on the air side, and the lower side is the layer on the substrate side. FIG. 7 is a photograph obtained by photographing the section of the polyimide membrane obliquely from the upper side, and in the figure, a white portion in the upper part expresses the section and surface of the layer of the surface on the air side of the polyimide membrane. It could be observed that in spaces (macrovoids) interposed between the both surfaces and the support part, the width was almost all 10 μm or more, and the length of the lateral direction was almost all 10 μm or more. Moreover, as is clear from FIG. 8, it could be observed that all of the section of the layer of the surface on the air side, the section of the layer of the surface on the substrate side and the section of the support part had a porous structure and that a large number of micropores were formed in each of them.

Figure 9:
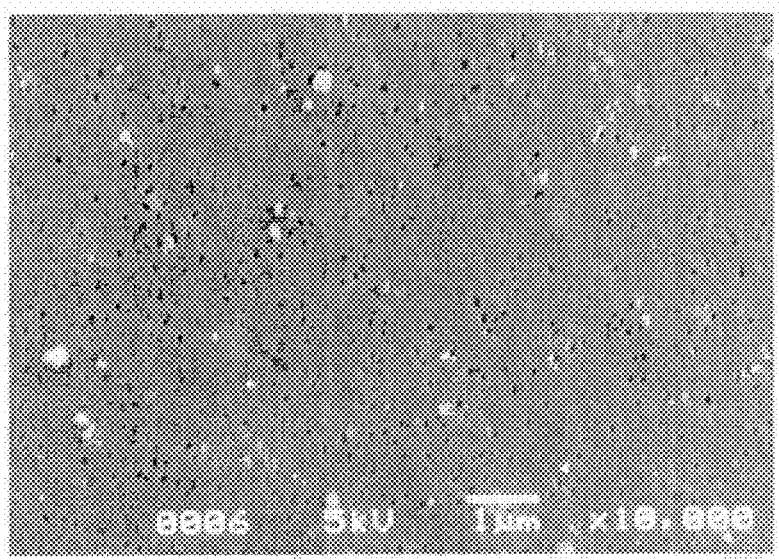
FIG. 9 is a scanning electron microscopic photograph of a surface on the air side of a porous polyimide membrane of Example 7.
Figure 10:
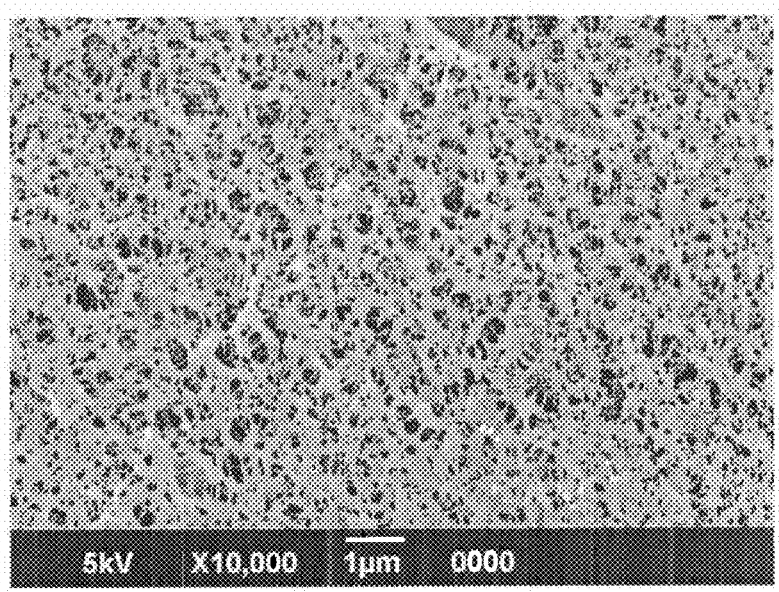
FIG. 10 is a scanning electron microscopic photograph of a surface on the substrate side of a porous polyimide membrane of Example 7.
Figure 11:
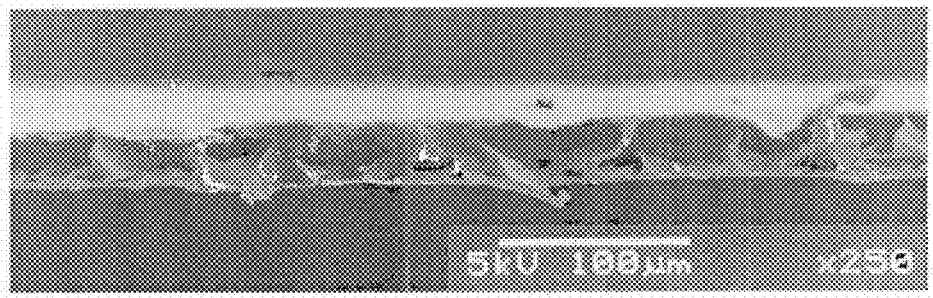
FIG. 11 is a scanning electron microscopic photograph of a lateral face section of a porous polyimide membrane of Example 7.
Figure 12:
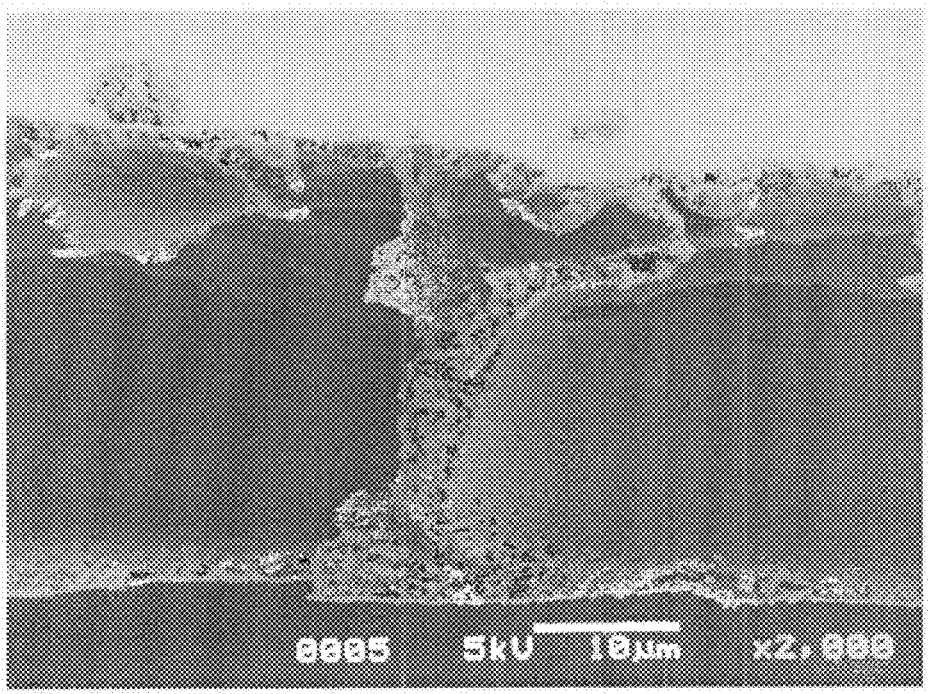
FIG. 12 is an enlarged photograph of FIG. 11.
Figure 13:
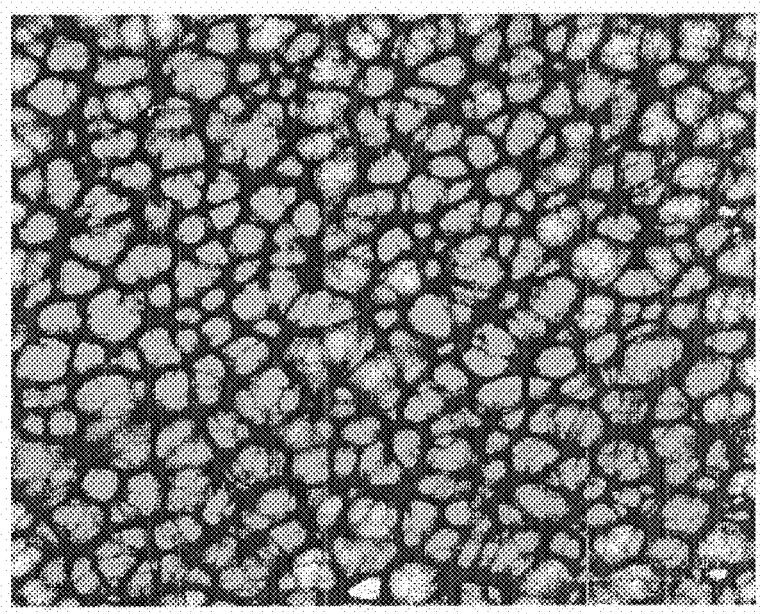
FIG. 13 is an optical microscopic photograph of a surface on the air side of a porous polyimide membrane of Example 8.

Scanning electron microscopic photographs of the porous polyimide membrane obtained in Example 7 are shown in FIGS. 9 to 12. FIG. 9 is a scanning electron microscopic photograph (magnification: 10,000) of the surface of the porous polyimide membrane on the air side opposite to the stainless steel-made substrate; FIG. 10 is a scanning electron microscopic photograph (magnification: 10,000) of the surface of the porous polyimide membrane on the stainless steel-made substrate side; FIG. 11 is a scanning electron microscopic photograph (magnification: 250) of the lateral face section; and FIG. 12 is an enlarged photograph (magnification: 2,000) of FIG. 11.

As is clear from FIG. 9, a large number of pores having a diameter of 0.3 μm or less could be observed on the surface on the air side. Furthermore, as is clear from FIG. 10, a large number of pores of from about 0.1 μm to about 5 μm could be observed on the surface on the substrate side. Furthermore, as is clear from FIG. 11, it could be observed that a layer of the surface on the air side, a layer of the surface on the substrate side and a partition wall supporting the both surfaces and partitioning the macrovoids from each other were formed and that the both surfaces and the partition wall (support part) were joined substantially in a ladder shape. Incidentally, in FIG. 11, the upper side is the layer of the surface on the air side, and the lower side is the layer of the surface on the substrate side. FIG. 11 is a photograph obtained by photographing the section of the polyimide membrane obliquely from the upper side, and in the figure, a white portion in the upper part expresses the section and surface of the layer of the surface on the air side of the polyimide membrane. It could be observed that in spaces (macrovoids) interposed between the both surfaces and the support part, the width was almost all 10 μm or more, and the length of the lateral direction was almost all 10 μm or more. Moreover, as is clear from FIG. 12, it could be observed that all of the section of the layer of the surface on the air side, the section of the layer of the surface on the substrate side and the section of the support part had a porous structure and that a large number of micropores were formed in each of them.

An optical microscopic photograph of the porous polyimide membrane obtained in Example 8 is shown in FIG. 13. FIG. 13 is an optical microscopic photograph (magnification: 200) obtained by photographing the porous polyimide membrane obtained in Example 8 by permeating light from the surface on the air side to the surface on the substrate side.

As is clear from FIG. 13, it could be observed that plural macrovoids were arranged in a honeycomb structure or a structure analogous thereto in the polyimide membrane.

Scanning electron microscopic photographs of the porous polyimide membrane obtained in Example 9 are shown in FIGS. 14 to 17.

Figure 14:
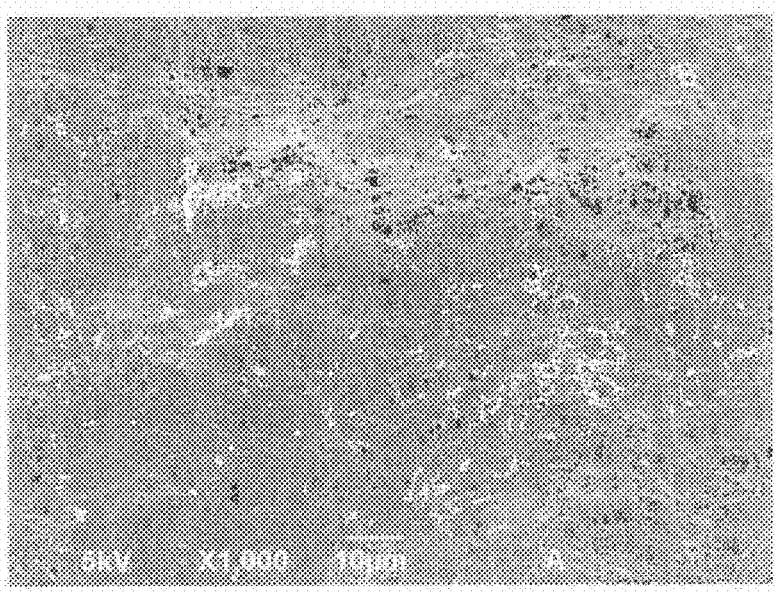
FIG. 14 is a scanning electron microscopic photograph of a surface on the air side of a porous polyimide membrane of Example 9.
Figure 15:
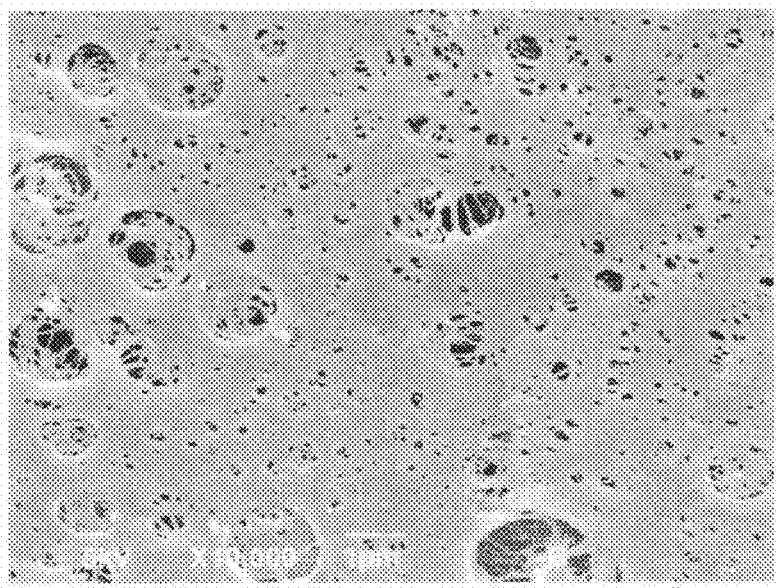
FIG. 15 is a scanning electron microscopic photograph of a surface on the substrate side of a porous polyimide membrane of Example 9.
Figure 16:
FIG. 16 is a scanning electron microscopic photograph of a lateral face section of a porous polyimide membrane of Example 9.
Figure 17:
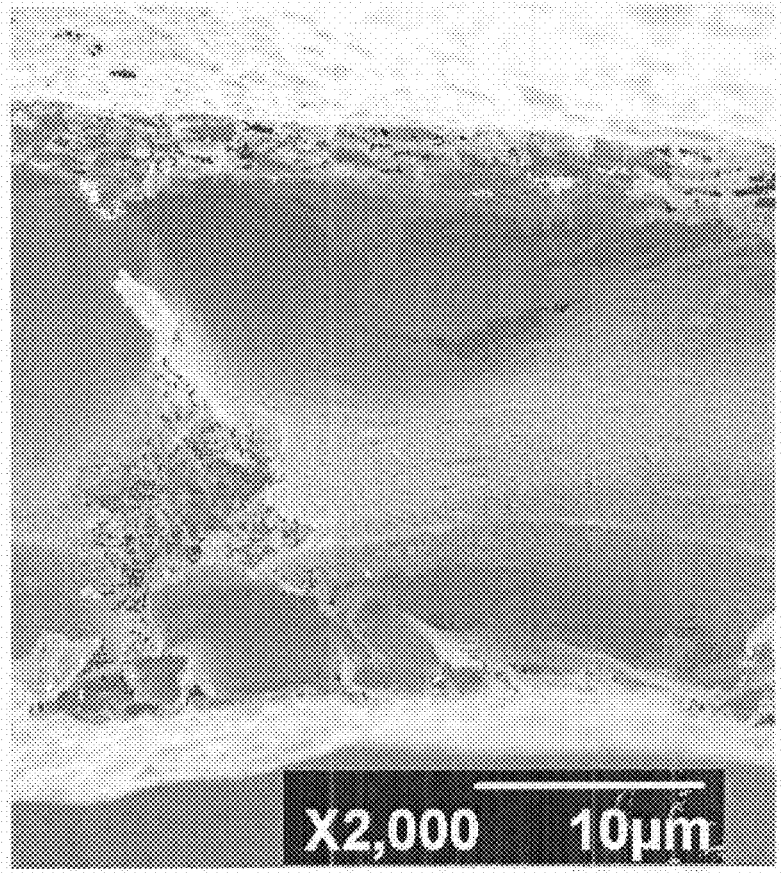
FIG. 17 is an enlarged photograph of FIG. 16.

FIG. 14 is a scanning electron microscopic photograph (magnification: 1,000) of the surface of the porous polyimide membrane on the air side opposite to the stainless steel-made substrate; FIG. 15 is a scanning electron microscopic photograph (magnification: 10,000) of the surface of the porous polyimide membrane on the stainless steel-made substrate side; FIG. 16 is a scanning electron microscopic photograph (magnification: 250) of the lateral face section; and FIG. 17 is an enlarged photograph (magnification: 2,000) of FIG. 16.

As is clear from FIG. 14, it could be observed that a large number of pores were present on the surface on the air side. Furthermore, as is clear from FIG. 15, a large number of pores of from about 0.1 μm to about 5 μm could be observed on the surface on the substrate side. Furthermore, as is clear from FIG. 16, it could be observed that a layer of the surface on the air side, a layer of the surface on the substrate side and a partition wall supporting the both surfaces and partitioning the macrovoids from each other were formed and that the both surfaces and the partition wall (support part) were joined substantially in a ladder shape. Incidentally, in FIG. 15, the upper side is the layer of the surface on the air side, and the lower side is the layer of the surface on the substrate side. It could be observed that in spaces (macrovoids) interposed between the both surfaces and the support part, the width was almost all 10 μm or more. Moreover, as is clear from FIG. 17, it could be observed that all of the section of the layer of the surface on the air side, the section of the layer of the surface on the substrate side and the section of the support part had a porous structure and that a large number of micropores were formed in each of them.

Figure 18:
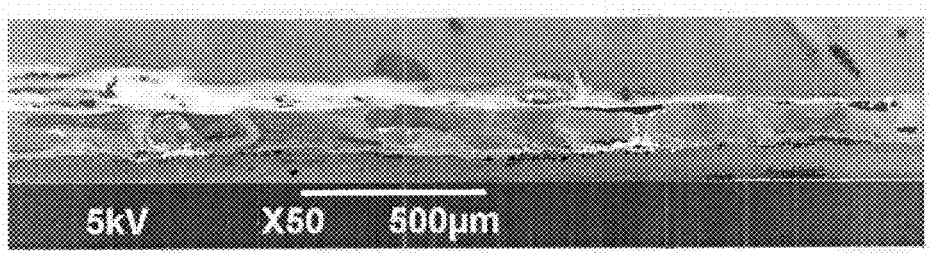
FIG. 18 is a scanning electron microscopic photograph of a lateral face section of a porous polyimide membrane of Example 12.

A scanning electron microscopic photograph of the porous polyimide membrane obtained in Example 12 is shown in FIG. 18.

FIG. 18 is a scanning electron microscopic photograph (magnification: 50) of the lateral face section. As is clear from FIG. 18, it could be observed that a layer of the surface on the air side, a layer of the surface on the substrate side and a partition wall supporting the both surfaces and partitioning the macrovoids from each other were formed and that the both surfaces and the partition wall (support part) were joined substantially in a ladder shape. It could be observed that in spaces (voids) interposed between the both surfaces and the support part, the width was almost all 200 μm or more.

Comparative Examples 1 to 7

Porous polyimide membranes were obtained in the same manner as in Example 1, except for changing the kind of the polymer solution and the composition of the coagulating bath as shown in Table 2.

The membrane thickness, porosity and air permeability (Gurley value) of each of the obtained porous polyimide membranes were measured. The results are shown in Table 2.

A section of each of the porous polyimide membranes obtained in Comparative Examples 1 to 7 was observed by a scanning electron microscope. As a result, in all of the porous polyimide membranes, it could be observed that a three-layer structure including two surface layers and a macrovoid layer interposed therebetween did not exist and that macrovoids did not substantially exist.

Figure 19:
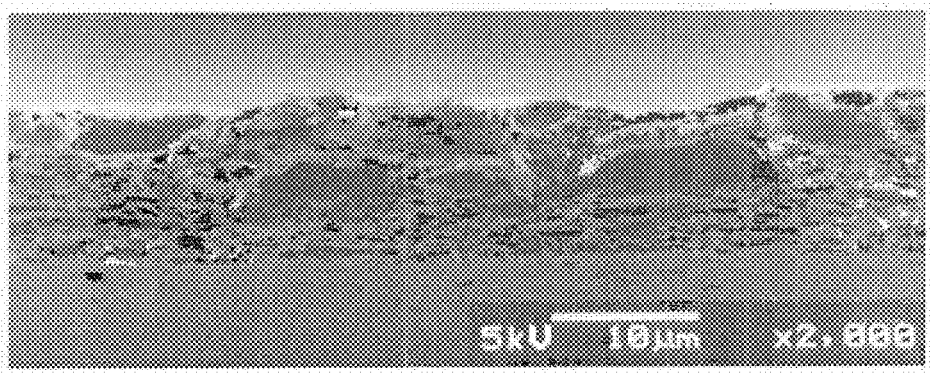
FIG. 19 is a scanning electron microscopic photograph of a lateral face section of a porous polyimide membrane of Comparative Example 3.
Figure 20:
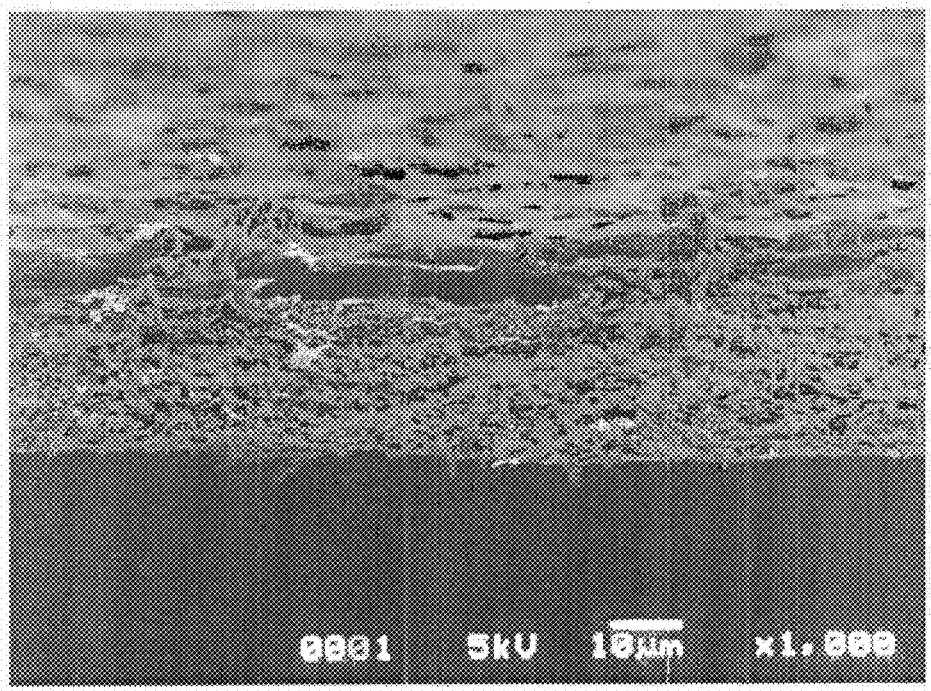
FIG. 20 is a scanning electron microscopic photograph of a lateral face section of a porous polyimide membrane of Comparative Example 5.

As representatives thereof, scanning electron microscopic photographs of a section of each of the porous polyimide membranes obtained in Comparative Examples 3 and 5 are shown in FIGS. 19 and 20. A magnification of the microscopic photograph of FIG. 19 is 2,000, and a magnification of the microscopic photograph of FIG. 20 is 1,000.

As is clear from FIG. 19, in the porous polyimide membrane obtained in Comparative Example 3, it could be observed that micropores were formed over the whole of the membrane section and that macrovoids did not substantially exist. Furthermore, it could also be observed that two surface layers and a macrovoid layer interposed therebetween did not exist. Some voids having a length of the membrane plate direction of 10 μm could be observed. However, a sectional area of the voids was less than 50% of the membrane sectional area. Furthermore, as is clear from FIG. 20, in the porous polyimide membrane obtained in Comparative Example 5, it could also be observed that micropores were formed over the whole of the membrane section and that macrovoids were not substantially present. Furthermore, it could also be observed that two surface layers and a macrovoid layer interposed therebetween did not exist. Furthermore, it could also be observed that a void having a length of the membrane plane direction of 10 μm or more did not exist.

Incidentally, the section of each of the porous polyimide membranes obtained in other Comparative Examples was the same as that in these Comparative Examples.

TABLE 1

| | | Polymer solution | | | | |
|---|---|---|---|---|---|---|
| | Kind of polymer solution | Acid component | Diamine component | Polymer concentration (% by mass) | BA [1] (parts by mass) | PVAC [2] (parts by mass) |
| Referential Example 1 | Polyamic acid solution composition A | s-BPDA | TPE-Q | 6 | 30 | 5 |
| Referential Example 2 | Polyamic acid solution composition B | s-BPDA | TPE-Q | 6 | 50 | 5 |
| Referential Example 3 | Polyamic acid solution composition C | s-BPDA | TPE-Q | 7 | 50 | 5 |
| Referential Example 4 | Polyamic acid solution composition D | s-BPDA | TPE-Q | 7 | 50 | 10 |

TABLE 1-continued

| | | Polymer solution | | | | |
|---|---|---|---|---|---|---|
| | Kind of polymer solution | Acid component | Diamine component | Polymer concentration (% by mass) | BA [1] (parts by mass) | PVAC [2] (parts by mass) |
| Referential Example 5 | Polyamic acid solution composition E | s-BPDA | TPE-Q | 7 | 50 | 0 |
| Referential Example 6 | Polyamic acid solution composition F | s-BPDA | ODA | 6.5 | 50 | 8 |
| Referential Example 7 | Polyamic acid solution composition G | s-BPDA | ODA | 7 | 50 | 5 |
| Referential Example 8 | Polyamic acid solution composition H | s-BPDA | ODA | 7 | 50 | 8 |
| Referential Example 9 | Polyamic acid solution composition I | s-BPDA | ODA | 7 | 50 | 0 |
| Referential Example 10 | Polyamic acid solution composition J | s-BPDA | TPE-Q | 6 | 0 | 5 |
| Referential Example 11 | Polyamic acid solution composition K | s-BPDA | TPE-Q | 6 | 0 | 10 |
| Referential Example 12 | Polyamic acid solution composition L | s-BPDA | TPE-Q | 6 | 0 | 20 |
| Referential Example 13 | Polyamic acid solution composition M | s-BPDA | TPE-Q | 6.5 | 0 | 5 |
| Referential Example 14 | Polyamic acid solution composition N | s-BPDA | ODA | 6.5 | 0 | 8 |

[1] BA: Benzole acid, addition proportion based on 100 parts by mass of the polyamic acid
[2] PVAC: Polyvinyl acetate, addition proportion based on 100 parts by mass of the polyamic acid

TABLE 2

| | | Composition of coagulating bath | | Characteristics of polyimide porous membrane | | | |
|---|---|---|---|---|---|---|---|
| | Kind of polymer solution | Water (parts by mass) | NMP (parts by mass) | Membrane thickness (μm) | Porosity (%) | Gurley value (sec) | Presence or absences of macrovoids |
| Example 1 | Polyamic acid solution composition A | 80 | 20 | 49 | 76 | 25 | Yes |
| Example 2 | Polyamic acid solution composition B | 80 | 20 | 52 | 82 | 22 | Yes |
| Example 3 | | 70 | 30 | 33 | 78 | 29 | Yes |
| Example 4 | | 60 | 40 | 36 | 81 | 23 | Yes |
| Example 5 | Polyamic acid solution composition C | 70 | 30 | 43 | 77 | 31 | Yes |
| Example 6 | Polyamic acid solution composition D | 70 | 30 | 32 | 71 | 11 | Yes |
| Example 7 | Polyamic acid solution composition E | 70 | 30 | 35 | 78 | 38 | Yes |
| Example 8 | Polyamic acid solution composition F | 70 | 30 | 45 | 78 | 29 | Yes |
| Example 9 | | 60 | 40 | 38 | 78 | 37 | Yes |
| Example 10 | Polyamic acid solution composition G | 50 | 50 | 27 | 76 | 44 | Yes |
| Example 11 | Polyamic acid solution composition H | 50 | 50 | 33 | 75 | 32 | Yes |
| Example 12 | Polyamic acid solution composition I | 80 | 20 | 133 | 86 | 21 | Yes |
| Comparative Example 1 | Polyamic acid solution composition J | 80 | 20 | 16 | 66 | 36 | No |
| Comparative Example 2 | Polyamic acid solution composition K | 80 | 20 | 16 | 64 | 85 | No |
| Comparative Example 3 | Polyamic acid solution composition L | 80 | 20 | 18 | 65 | 77 | No |
| Comparative Example 4 | Polyamic acid solution composition M | 80 | 20 | 48 | 61 | 76 | No |
| Comparative Example 5 | | 70 | 30 | 38 | 67 | 45 | No |
| Comparative Example 6 | Polyamic acid solution composition N | 80 | 20 | 32 | 56 | 29 | No |
| Comparative Example 7 | | 70 | 30 | 31 | 66 | 67 | No |

Comparative Examples 8 and 9

With respect to each of commercially available polytetrafluoroethylene (PTFE) nonwoven fabric and membrane filer (a trade name: OMNIPORE, manufactured by Millipore, filter type: 10 μmJC), the rate of change in the membrane thickness after applying a compression stress load of 0.5 MPa at 250° C. for 15 minutes was measured. As a result, the rate of change in the membrane thickness was 52% and 78%, respectively.

INDUSTRIAL APPLICABILITY

The porous polyimide of the present invention is excellent in material permeability of a gas or the like and can be suitably used for applications such as a gas filter, a liquid filter and a breathing component.

[Reference Signs List]

| 1: | Porous polyimide membrane |
|---|---|
| 2: | Surface layer (a) |
| 25: | Micropore |
| 3: | Macrovoid layer |
| 31: | Macrovoid |
| 32: | Partition wall (support part) |
| 35: | Micropore |
| 4: | Surface layer (b) |
| 45: | Pore |

The invention claimed is:

1. A porous polyimide membrane of a three-layer structure, comprising:
   two surface layers (a) and (b); and
   a macrovoid layer interposed between the surface layers (a) and (b),
   wherein
   the macrovoid layer comprises a partition wall joined to the surface layers (a) and (b), and plural macrovoids surrounded by the partition wall and the surface layers (a) and (b), with an average void diameter in a membrane plane direction of from 10 to 500 μm, each of the partition wall of the macrovoid layer and the surface layers (a) and (b) has a thickness of from 0.1 to 50 μm and has plural pores having an average pore diameter of from 0.01 to 5 μm, the pores being in communication with each other and also in communication with the macrovoids, and the membrane has a total membrane thickness of from 5 to 500 μm and a porosity of from 70 to 95%.

2. The membrane of claim 1, wherein the macrovoid layer comprises plural macrovoids having an average pore diameter in a membrane plane direction, as observed from at least one selected from the group consisting of a surface layer (a) side and a surface layer (b) side, of from 10 to 500 μm.

3. The membrane of claim 2, wherein the partition wall of the macrovoid layer and the surface layers (a) and (b) have substantially the same thickness.

4. The membrane of claim 2, having a Gurley value of 100 seconds or less.

5. The membrane of claim 2, having a rate of change in the membrane thickness after applying a compression stress load of 0.5 MPa at 250° C. for 15 minutes, of 5% or less.

6. The membrane of claim 1, wherein the partition wall of the macrovoid layer and the surface layers (a) and (b) have substantially the same thickness.

7. The membrane of claim 6, having a Gurley value of 100 seconds or less.

8. The membrane of claim 6, having a rate of change in the membrane thickness after applying a compression stress load of 0.5 MPa at 250° C. for 15 minutes, of 5% or less.

9. The membrane of claim 1, having a Gurley value of 100 seconds or less.

10. The membrane of claim 9, having a rate of change in the membrane thickness after applying a compression stress load of 0.5 MPa at 250° C. for 15 minutes, of 5% or less.

11. The membrane of claim 1, having a rate of change in the membrane thickness after applying a compression stress load of 0.5 MPa at 250° C. for 15 minutes, of 5% or less.

12. The membrane of claim 1, wherein, in a section when the membrane is cut vertically against a membrane plane direction, a sectional area of the macrovoids having an average pore diameter in the membrane plane direction of from 10 to 500 μm is 50% or more of a sectional area of the membrane.

13. The membrane of claim 1, wherein, in a section when the porous polyimide membrane is cut vertically against a membrane plane direction, 60% or more of the macrovoids have a ratio (L/d) of a length (L) of the membrane plane direction to a length (d) of a membrane thickness direction falling within a range of from 0.5 to 3.

14. The membrane of claim 13, having a glass transition temperature of 240° C. or higher, or not having a distinct transition point at 300° C. or higher.

15. A process for production of the membrane of claim 1, comprising:
   casting a polyamic acid solution composition comprising
   (A) a polyamic acid solution comprising from 0.3 to 60% by mass of a polyamic acid comprising a tetracarboxylic acid unit and a diamine unit and from 40 to 99.7% by mass of an organic polar solvent, and
   (B) from 0.1 to 200 parts by mass, based on 100 parts by mass of the polyamic acid, of a polar group-comprising organic compound,
   into a shape of a film and dipping the film in or bringing it into contact with a coagulating solvent comprising water as an essential component to fabricate a porous membrane of a polyamic acid; and
   thermally treating the porous membrane of a polyamic acid obtained in the casting to achieve imidation,
   wherein the polar group-comprising organic compound (B) is an organic compound which promotes invasion of water into a film-shaped cast material of the polyamic acid solution composition.

16. The process of claim 15, wherein the polyamic acid is obtained from at least one tetracarboxylic dianhydride selected from the group consisting of a biphenyl tetracarboxylic dianhydride and pyromellitic dianhydride, and at least one diamine selected from the group consisting of a benzenediamine, a diaminodiphenyl ether, and a bis(aminophenoxy)phenyl.

17. The process of claim 15, wherein the polar group-comprising organic compound (B) is benzoic acid.

18. The process of claim 15, wherein the polyamic acid solution composition further comprises:
   (C) from 0.1 to 100 parts by mass, based on 100 parts by mass of the polyamic acid, of a vinyl polymer.

19. The process of claim 18, wherein the vinyl polymer (C) is at least one selected from the group consisting of polyvinyl acetate, polystyrene, and polymethyl methacrylate.

20. The process of claim 15, wherein the coagulating solvent is water or a mixed solution of 5% by mass or more and less than 100% by mass of water and more than 0% by mass and 95% by mass or less of an organic polar solvent.

* * * * *

UNITED STATES PATENT AND TRADEMARK OFFICE
CERTIFICATE OF CORRECTION

PATENT NO. : 8,420,211 B2  
APPLICATION NO. : 13/121830  
DATED : April 16, 2013  
INVENTOR(S) : Ohya et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 180 days.

Signed and Sealed this
First Day of September, 2015

Michelle K. Lee
*Director of the United States Patent and Trademark Office*